United States Patent
Huang et al.

(10) Patent No.: US 6,815,536 B2
(45) Date of Patent: Nov. 9, 2004

(54) MONOAZO REACTIVE RED DYESTUFF

(75) Inventors: Huei-Chin Huang, Taoyuan (TW); Chia-Huei Yu, Iian (TW)

(73) Assignee: Everlight USA, Inc., Pineville, NC (US)

(*) Notice: Subject to any disclaimer, the term of this patent is extended or adjusted under 35 U.S.C. 154(b) by 64 days.

(21) Appl. No.: 10/271,774

(22) Filed: Oct. 17, 2002

(65) Prior Publication Data
US 2004/0087780 A1 May 6, 2004

(51) Int. Cl.$^7$ .................. C09B 62/51; D06P 1/384
(52) U.S. Cl. ............... 534/612; 534/638; 534/642; 8/549
(58) Field of Search ................ 534/612, 638, 534/642; 8/549

(56) References Cited

U.S. PATENT DOCUMENTS

| | | | | |
|---|---|---|---|---|
| 4,837,310 A | * | 6/1989 | Morimitsu et al. | .......... 534/638 |
| 6,114,511 A | * | 9/2000 | Dannheim | .................. 534/638 |

FOREIGN PATENT DOCUMENTS

| | | | |
|---|---|---|---|
| JP | 62-164765 | * | 7/1987 |
| JP | 62-167363 | * | 7/1987 |
| JP | 62-167364 | * | 7/1987 |

OTHER PUBLICATIONS

English abstract of JP 62–164765.*
English abstract of JP 62–167363.*
English abstract of JP 62–167364.*

* cited by examiner

Primary Examiner—Fiona T. Powers
(74) Attorney, Agent, or Firm—Bacon & Thomas

(57) ABSTRACT

A monoazo reactive red dyestuff of the formula (I),

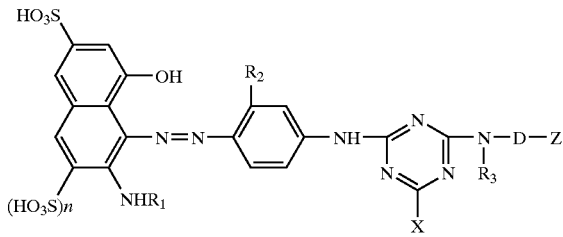

(I)

wherein the $R_1$, $R_2$, $R_3$, X, D, Z and n are as defined in the description. These kinds of dyestuffs are suitable for dyeing and printing of materials containing either cellulose fibers, such as cotton, artificial cotton, linen, and artificial linen, or synthetic polyamide, such as wool, silk, and nylon etc., as well as on mixed or cross-linked cellulose fibers and other fibers. Dyed materials with excellent properties can be obtained, showing especially outstanding performance in of wash-off, level-dyeing, light fastness and perspiration-light fastness.

22 Claims, No Drawings

MONOAZO REACTIVE RED DYESTUFF

BACKGROUND OF THE INVENTION

1. Field of the Invention

The invention relates to the technical field of the fiber-reactive dyes, in particular relates to a novel monoazo reactive red dyestuff.

2. Description of Related Art

The practice of dyeing with fiber-reactive dyes has led to heightened expectations of the quality of the dyeings. Consequently there continues to be a demand for novel fiber-reactive dyes that have improved properties. Especially in demand are red reactive dyes having high fastness properties. It is true that British Patent No. 836,248, U.S. Pat. No. 2,979,498 and European Patent Application Publication No. 0 070 806 disclose numerous red fiber-reactive dyes, but the fastness properties of the dyeings obtainable with these dyes, especially the lightfastness and the perspiration lightfastness, are in need of improvement.

U.S. Pat. No. 5,227,475 discloses fiber-reactive dyestuffs having the following formula:

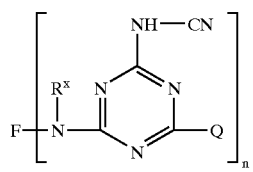

(II)

The practice of dyeing using reactive dyestuffs has improved the quality of the dyeings and the efficiency of the dyeing process. Reactive dyestuffs generally display good dyeing and fastness properties but the light fastness, alone and in presence of perspiration, of red fiber-reactive dyestuffs is generally only modest and in need of improvement.

SUMMARY OF THE INVENTION

The present invention provides novel azo compounds having improved properties in this respect and are azo derivatives which compounds conform to the formula (I),

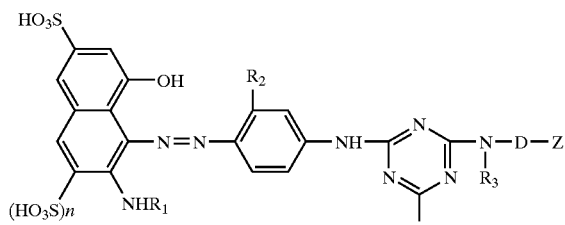

(I)

wherein:
X is —NHCN, —OH, —SCH2COOH, —NHSO2CH3, 3-carboxypyridinium,

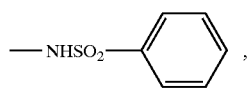

halogen; preferably X is —NHCN, 3-carboxypyridinium or halogen, wherein the halogen is preferably fluorine or chlorine;

D is a phenyl or naphthyl group having 0 to 3 substituent groups, said substituent groups are selected from the groups consisting of halogen, $C_{1-4}$ alkyl, $C_{1-4}$ alkoxyl, nitro, amino, hydroxyl, carboxyl, phosphonic acid and sulfo group; preferably D is phenyl having 0 to 3 substituent groups;

Z is —$SO_2$—CH=$CH_2$ or $SO_2$—$CH_2$—$CH_2$—U; U is —$OSO_3H$, Cl, Br, —$OPO_3H_2$, —$SSO_3H$ or

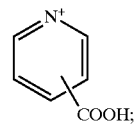

preferably Z is —$SO_2CH$=$CH_2$
or —$SO_2$—$CH_2$—$CH_2$—$OSO_3H$;
$R_2$ is sulfo, carboxy, halogen or $C_{1-4}$ alkoxy; preferably $R_2$ is sulfo or carboxy;
n is 0 or 1, and preferably n is 1;
when X is a halogen atom, $R_1$ is limited to a hydrogen atom and $R_3$ is limited to $C_{1-4}$ alkyl or $C_{1-4}$ alkyl having at least one substituent; preferably when X is fluorine atom or chlorine atom, $R_1$ is hydrogen atom and $R_3$ is $C_{1-4}$ alkyl; when X is —NHCN, —OH, —$SCH_2COOH$, —$NHSO_2CH_3$, 3-carboxypyridinium or

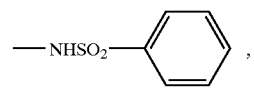

$R_1$ and $R_3$ independently can be any group selected from hydrogen atom, $C_{1-4}$ alkyl, phenyl,

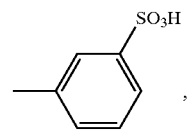

or $C_{1-4}$ alkyl having one or more substituent group selected from hydroxyl, carboxyl, sulfo, carbamoyl or methoxy carbonyl; preferably $R_1$ and $R_3$ is hydrogen atom or $C_{1-4}$ alkyl.

The dyestuffs of the present invention is preferably represented by the following formula (Ia),

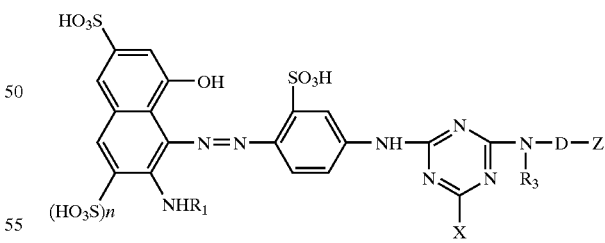

(Ia)

wherein:
X is —NHCN, —OH, —$SCH_2COOH$, —$NHSO_2CH_3$, 3-carboxypyridinium,

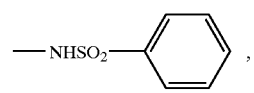

halogen; preferably X is —NHCN, 3-carboxypyridinium fluorine or chlorine;

D is a phenyl or naphthyl having 0 to 3 substituent groups, said substituent groups are selected from the group consisting of halogen, $C_{1-4}$ alkyl, $C_{1-4}$ alkoxyl, nitro, amino, hydroxyl, carboxyl, phosphonic acid and sulfo group; preferably D is phenyl having 0 to 3 substituent groups;
Z is —$SO_2$—CH=$CH_2$ or $SO_2$—$CH_2$—$CH_2$—U; U is —$OSO_3H$, Cl, Br, —$OPO_3H_2$, —$SSO_3H$ or

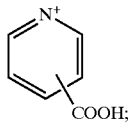

preferably Z is —$SO_2CH=CH_2$
or —$SO_2$—$CH_2$—$CH_2$—$OSO_3H$;
n is 0 or 1, and preferably n is 1;
when X is a halogen atom, R1 is limited to a hydrogen atom and $R_3$ is limited to $C_{1-4}$ alkyl or $C_{1-4}$ alkyl having at least one substituent; preferably when X is fluorine atom or chlorine atom, $R_1$ is hydrogen atom and $R_3$ is $C_{1-4}$ alkyl;
when X is —NHCN, —OH, —$SCH_2COOH$, —$NHSO_2CH_3$, 3-carboxypyridinium or

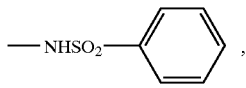

$R_1$ and $R_3$ independently can be any group selected from hydrogen atom, $C_{1-4}$ alkyl, phenyl,

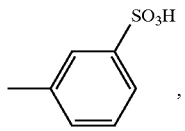

or $C_{1-4}$ alkyl having one or more substituent group selected from hydroxyl, carboxyl, sulfo, carbamoyl or methoxy carbonyl; preferably $R_1$ and $R_3$ is hydrogen atom or $C_{1-4}$ alkyl.

The formula (I) dyestuff of the present invention is also preferably represented by the following formula (Ib),

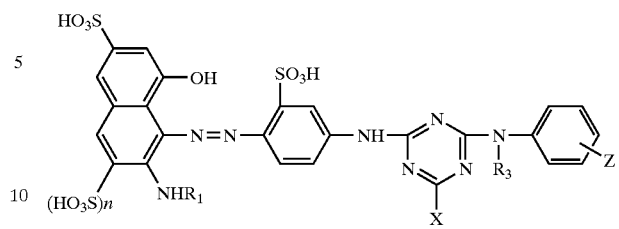

wherein:
X is —NHCN, —OH, —$SCH_2COOH$, —$NHSO_2CH_3$, 3-carboxypyridinium,

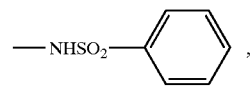

halogen; preferably X is —NHCN, 3-carboxypyridinium, chlorine or fluorine;
Z is —$SO_2$—CH=$CH_2$ or $SO_2$—$CH_2$—$CH_2$—U ; U is —$OSO_3H$, Cl or Br; preferably Z is —$SO_2$—$CH_2$—$CH_2$—$OSO_3H$;
n is 0 or 1, and preferably n is 1;
when X is a chlorine atom or fluorine atom, $R_1$ is limited to a hydrogen atom and $R_3$ is limited to $C_{1-4}$ alkyl; preferably $R_1$ is hydrogen atom and $R_3$ is methyl or ethyl;
when X is —NHCN, —OH, —$SCH_2COOH$, —$NHSO_2CH_3$, 3-carboxypyridinium or

$R_1$ and $R_3$ independently can be any group selected from hydrogen atom, $C_{1-4}$ alkyl, or $C_{1-4}$ alkyl having one or more substituent group selected from hydroxyl, carboxyl, sulfo, carbamoyl or methoxy carbonyl;
preferably when X is fluorine atom or chlorine atom, $R_1$ and $R_3$ is hydrogen atom, methyl, or ethyl.

The formula (Ib) dyestuff is preferably the following formula (I-1) dyestuff:

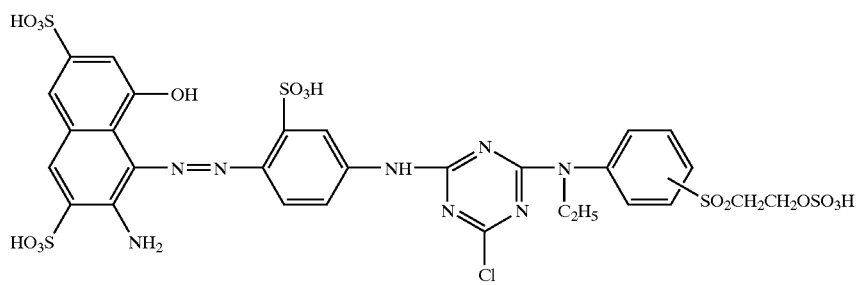

The formula (Ib) dyestuff is preferably the following formula (I-2) dyestuff:
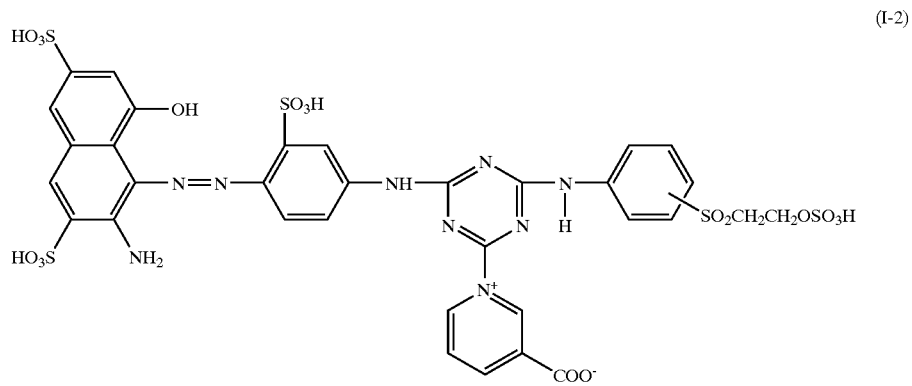
(I-2)
The formula (Ib) dyestuff is preferably the following formula (I-3) dyestuff:
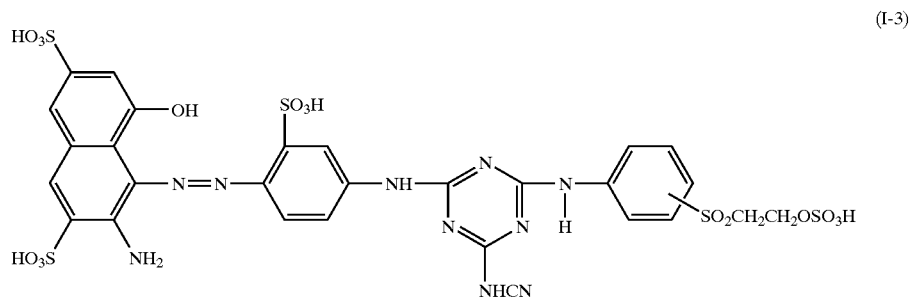
(I-3)
The formula (Ib) dyestuff is preferably the following formula (I-4) dyestuff:
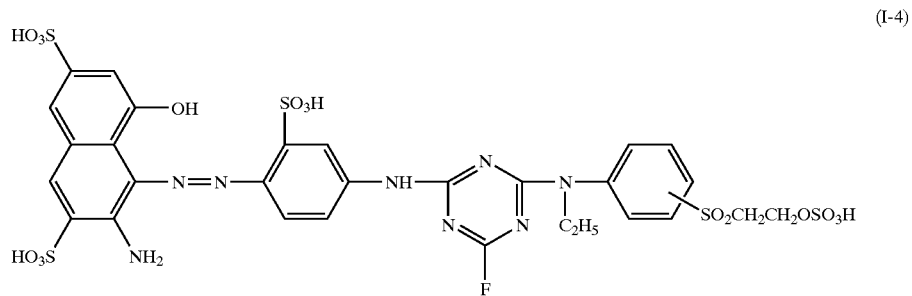
(I-4)
The formula (Ib) dyestuff is preferably the following formula (I-1) dyestuff:
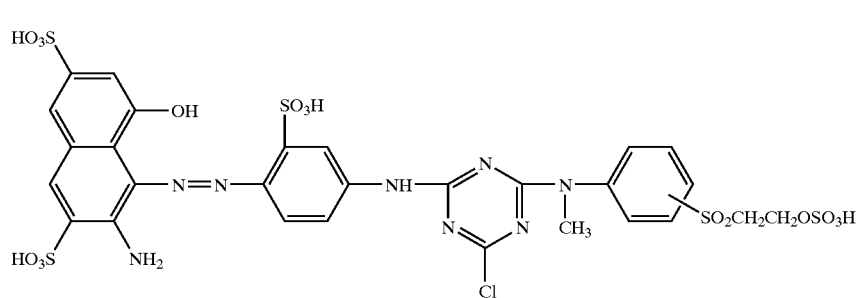
(I-5)

The formula (Ib) dyestuff is preferably the following formula (I-6) dyestuff

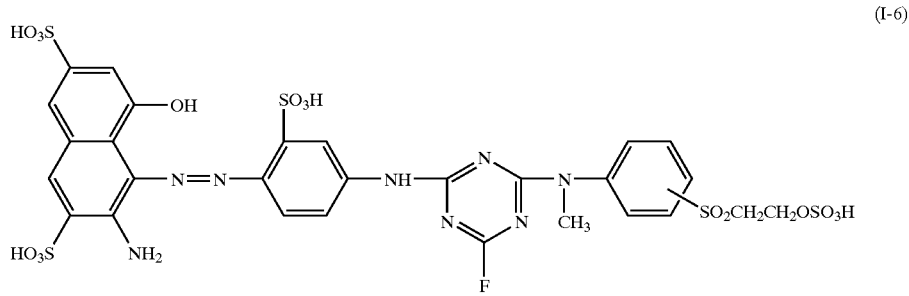

(I-6)

These kinds of dyestuffs are suitable for dyeing of materials containing either cellulose fibers, such as cotton, synthetic cotton, hemp, and synthetic hemp, or synthetic polyamide and polyurethane fibers, such as wool, silk, and nylon. Dyed materials with excellent properties can be obtained, showing especially outstanding performance in light fastness.

Other objects, advantages, and novel features of the invention will become more apparent from the following detailed description when taken in conjunction with the accompanying drawings.

DETAILED DESCRIPTION OF THE PREFERRED EMBODIMENT

Dyestuffs (I) of the present invention can be synthesized by the following reaction sequence step (a) to step (c).

Step (a):

The compound of the formula (III) is reacted with 1,3,5-trihalogen triazine of formula (IV) to obtain the following compound of formula (V),

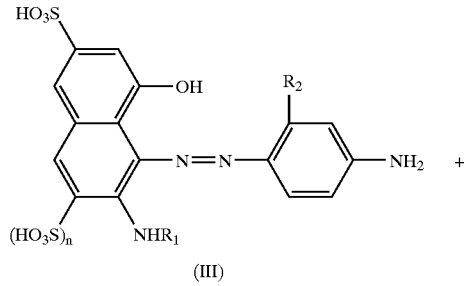

(III)

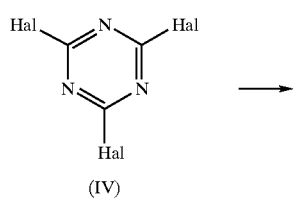

(IV)

-continued

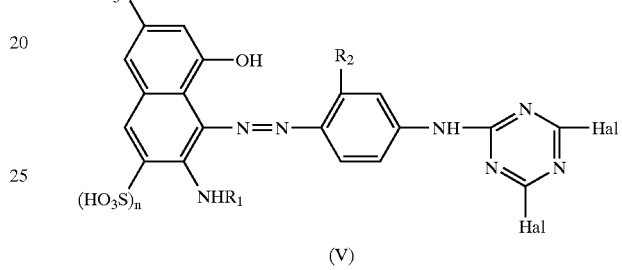

(V)

wherein Hal is —F, —Cl, —Br; $R_1$, $R_2$, and n are defined as above formula (I). The reaction is carried out in aqueous solution at a temperature between 0 to 30° C., and below 20° C. is preferred. The acid generated in the reaction is neutralized by adding an acid-binding agent, and the pH is controlled between 3 to 7. Upon completion of the reaction, the product of formula (V) is obtained.

Step (b):

If while the X is not halogen, the compound of formula (V) is reacted with the compound of formula (VI) to obtain compound of formula (VII),

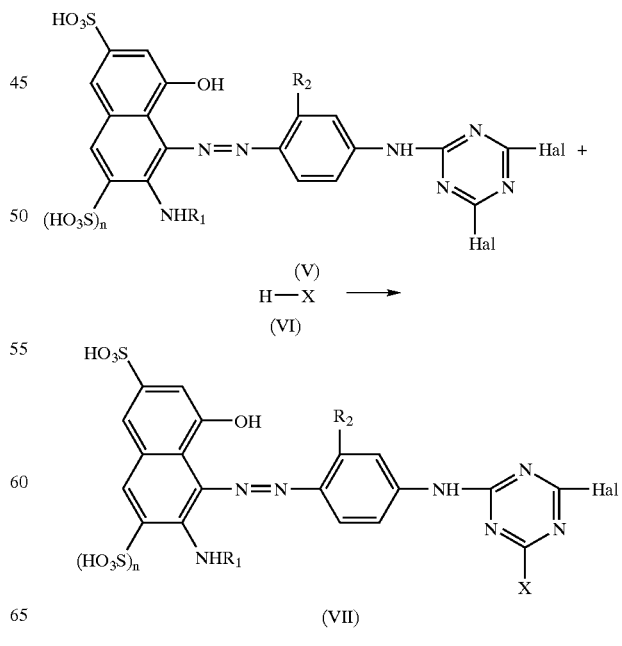

wherein Hal is —F, —Cl, —Br; X is —NHCN, —OH, —SCH$_2$COOH, —NHSO$_2$CH$_3$, 3-carboxypyridinium,

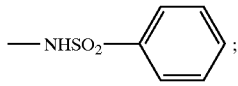

R$_1$, R$_2$, and n are defined as for formula (I) above. The reaction temperature is controlled between 20 and 80° C., 40 to 60° C. is preferred. The acid generated in the reaction is neutralized by adding an acid binding agent. The pH is controlled between 4 and 12, and 6 to 10 is preferred. Upon completion the product of formula (VII) is obtained.

Step (c):

After the above reaction is completed, the compound of formula (VIII),

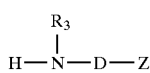
(VIII)

wherein R$_3$, D, and Z are defined as above, is then added to the solution of the compound of formula (VII). IF X is halogen, the compound of formula (VIII) wherein R$_3$, D, and Z are defined as the above, is then added to the solution of the compound of formula (V). The reaction temperature is controlled between 30 to 100° C., and 55 to 85° C. is preferred. The acid generated in the reaction is neutralized by adding an acid binding agent. The pH is controlled between 3 to 11, 3 to 7 is preferred. Upon completion of the reaction, dyestuffs represented by formula (I) are obtained.

In the above reaction steps (a) to (c), the compounds of formula (III) and (IV) and (VI) and (VIII) can be reacted with one another in any sequence to yield the derivatives represented by formula (I).

The preparation of the compound of formula (III) is described in U.S. Pat. No. 4,837,310.

Compound (III) can be produced from a nitro compound of formula (X), which is diazotized at −10 to 20° C. in conventional manner, followed by coupling with a naphthol of formula (XI) at a temperature of −10 to 50° C., preferably 0 to 30° C., while controlling the pH within a range of 1 to 7, preferably 1 to 5. The resulting compound (XII) obtained is then reduced at a temperature of 40 to 100° C. in the presence of sodium sulfide. According to any one of the above sequences, the monoazo naphthol compound of the formula (III) can be obtained.

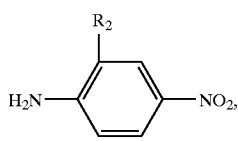
(X)

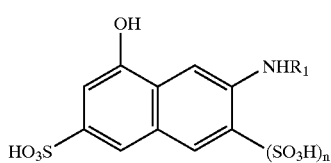
(XI)

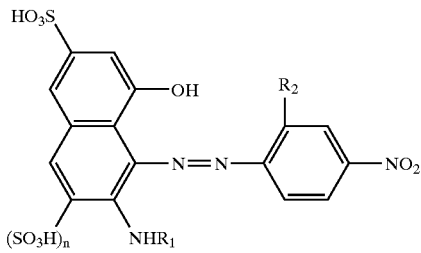
(XII)

Examples of compounds of formula (X) include:

2-methoxy-4-nitroaniline, 2-ethoxy-4-nitroaniline, 2-propoxy-4-nitroaniline, 2-butoxy-4-nitroaniline, 4-nitroaniline-2-sulfonic acid, 2-carboxy-4-nitroaniline, 2-fluoro-4-nitroaniline, 2-chloro-4-nitroaniline, 2-bromo-4-nitroaniline.

Examples of the compounds of formula (XI) are:

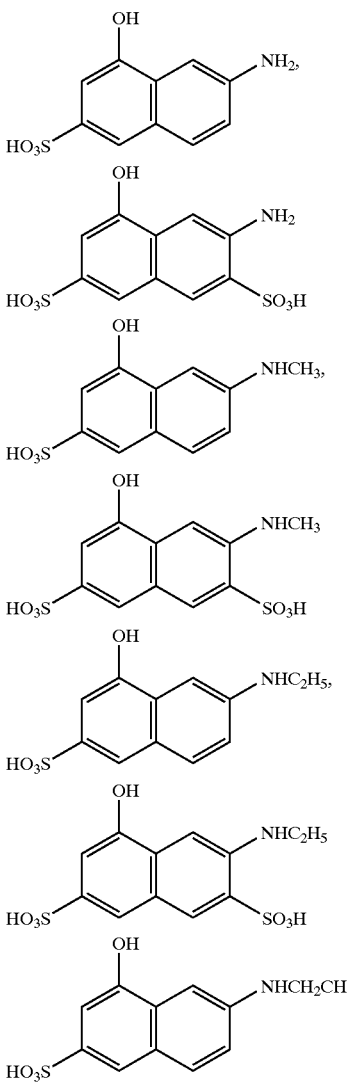

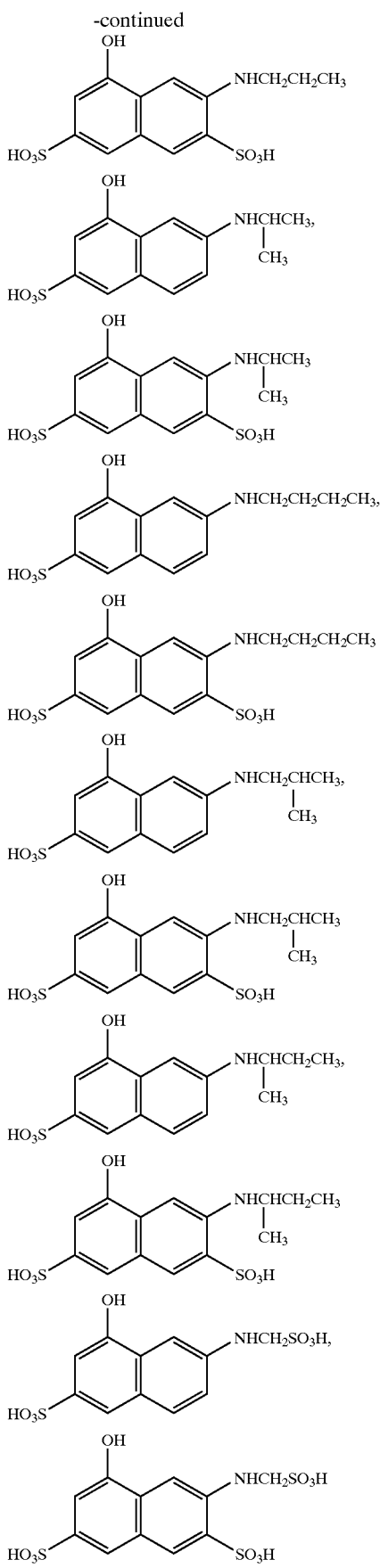

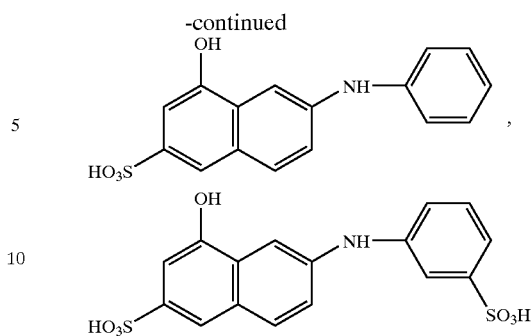

The above compounds of formula (VIII) can be synthesised by reacting the compound of formula (XIII) with an alkylating agent.

$$H_2N-D-Z \qquad (XIII)$$

Examples of the alkylation reagents are: alkylhalide, dialkylsulfate, monosubstituted ethylene, or alkene oxide.

Examples of the alkylhalide are: methylchloride, ethylchloride, n-propylchloride, isopropylchloride, n-butylchloride, isobutylchloride, sec-butylchloride, methylbromide, ethylbromide, n-propylbromide, isopropylbromide, n-butylbromide, isobutylbromide, sec-butylbromide.

Examples of the dialkylsulfate are: dimethylsulfate, diethylsulfate, dipropylsulfate. Examples of the monosubstituted ethylene are: acrylonitrile, acrylic acid, methylacrylate, ethylacrylate, acrylamide, vinylsulfonic acid. Examples of the alkene oxide are: ethyleneoxide, propyleneoxide, glycol, trimethyleneoxide, β-buthyloxide, 2-methyl-α-buthyleneoxide, 2-ethyl-3 -methyleneoxide, methoxyethyleneoxide, or n-buthoxyleneoxide.

Examples of compound of formula (XIII) are:
1-aminobenzene-3-β-sulfatoethylsulfone,
1-aminobenzene-4-β-sulfatoethylsulfone,
1-aminobenzene-3 -phosphatoethylbenzene,
1-amino-4-methylbenzene-3-β-sulfatoethylsulfone,
1-aminobenzene-3-β-chloroethylsulfone,
1-amino-4-methoxybenzene-3-β-sulfatoethylsulfone,
1-amino-2,5-dimethylbenzene-4-β-sulfatoethylsulfone,
1-amino-2-methoxybenzene-4-β-sulfatoethylsulfone,
1-amino-2-chlorobenzene-4-β-sulfatoethylsulfone,
1-amino-4-methoxybebzene-5-β-sulfatoethylsulfone,
2-aminonaphthalene-8-β-sulfatoethylsulfone-6-sulfonic acid,
2-aminonaphthalene-8-β-sulfatoethylsulfone,
1-amino-2,5-dimethoxybenzene-4-vinylsulfone,
1-amino-2-methoxy-5-methylbenzene-4-β-sulfatoethylsulfone,
2-aminonaphthalene-4,5,6-β-sulfatoethylsulfone,
2-aminonaphthalene-4,5,7-β-sulfatoethylsulfone,
1-amino-2-bromobenzene-4-vinylsulfone,
2-amino-8-sulfonaphthalene-6-β-sulfatoethylsulfone,
2-aminonaphthalene-8-β-phhosphatoethylsulfone-6-sulfonic acid,
2-aminonaphthalene-8-vinylsulfone-6-sulfonic acid,
1-amino-2-methoxy-5-methylbenzene-4-µ-chloroethylsulfone,
1-aminobenzene-2,3-vinylsulfone, 1-aminobenzene-2,4-vinylsulfone,
1-amino-2-methoxy-5-chlorobenzene-4-β-chloroethylsulfone,
1-amino-2-methoxy-5-chlorobenzene-4-vinylsulfone,
1-amino-2-ethoxy-5-chlorobenzene-4-β-chloroethylsulfone, 1-amino-2-ethoxy-5-chlorobenzene-4-vinylsulfone,
2-aminonaphthalene-8-β-sulfatoethylsulfone-1-sulfonic acid,
5-chloroaniline-2-β-sulfatoethylsulfone,
5-sulfoaniline-2-β-sulfatoethylsulfone, aniline-2-β-phosphatoethylsulfone,
5-chloroaniline-2-β-phosphatoethylsulfone, 5-chloroaniline-2-vinylsulfone,
5-sulfoaniline-2-vinylsulfone, aniline-2-β-chloroethylsulfone,
5-chloroaniline-2-β-chloroethylsulfone,
5-sulfoaniline-2-β-chloroethylsulfone, aniline-2-β-thiosulfatoethylsulfone,
5-chloroaniline-2-β-thiosulfatoethylsulfone,
5-sulfoaniline-2-β-thiosulfatoethylsulfone,
3-Amino-2'-(2-sulfatoethylsulfonyl)ethylbenzamide,
4-Amino-2'-(2-sulfatoethylsulfonyl)ethylbenzamide.

The dyestuffs of the present invention can be produced by the above methods, reaction conditions are fully described in the above description. The dyestuffs of the present invention can be purified by known processes such as spray drying, precipitation, or filtration. They can be in the form of powder, granules, particle or liquid and an auxiliary reagent, for example, retarding agent, leveling agent, assistant agent, surfactant agent, or dispersing agent may be added.

The dyestuffs of the present invention all contain at least one anionic group, such as a sulfonic acid group. For convenience they are expressed as free acid in the specification. When the dyestuffs of the present invention are manufactured, purified or used, they often exist in the form of water soluble salts, especially the alkaline metal salts, such as the sodium salt, lithium salt, potassium salt or ammonium salt, preferably sodium salt.

The dyestuffs of formula (I) in accordance with the present invention are fiber-reactive and useful for dyeing or printing hydroxyl group-containing and amide group-containing materials.

The dyestuffs of formula (I) according to the invention are suitable for dyeing and printing the various materials, such as silk, leather, wool, polyamide fibers and polyurethanes, and in particular all types of fiber materials containing cellulose. Examples of such fiber materials are the natural cellulose fibers, such as cotton, linen and hemp, as well as cellulose and regenerated cellulose. The dyestuffs of formula (I) are also suitable for dyeing or printing fibers which contain hydroxy groups and are contained in blended fabrics, for example mixtures of cotton with polyester fibers or polyamide fibers.

The dyestuffs according to the invention can be applied to the fiber material and fixed on the fiber in various ways, in particular in the form of aqueous dyestuff solutions and printing pastes. They are suitable both for the exhaust dyeing and for dyeing by the pad-dyeing process, in which the goods are impregnated with aqueous dyestuff solutions, if appropriate containing salts, and the dyestuff is fixed, after an alkali treatment or in the presence of alkali, if appropriate under the action of heat. The dyestuffs according to the invention are particularly suitable for the so-called cold pad-batch process, in which the dyestuff is applied to the padder together with the alkali and is then fixed by storage at room temperature for several hours. After fixing, the dyeings or prints are rinsed thoroughly with cold and hot water, if appropriate with addition of a dispersing agent which promotes diffusion of the non-fixed dye residues.

The present invention therefore also relates to the use of the compounds of the formula (I) according to the invention for dyeing (including printing) these materials and to processes for dyeing (and printing) such materials by a procedure which is customary per se, in which a compound of the formula (I) is employed as the coloring agent, by applying the compound of formula (I) to the material in an aqueous medium and fixing it on the material by means of heat or by means of an alkali or by means of both.

The dyestuffs of formula (I) are distinguished by a high reactivity, good fixing capacity and very good build-up capacity. The dyestuffs of the formula (I) can also exhibit excellent color-depth, level-dyeing and wash-off properties and high solubility as well as high exhaustion and fixation percentages. They can therefore be employed by the exhaust dyeing process at low dyeing temperatures and require only short steaming times in the pad-steam process. The degrees of fixing are high and the non-fixed portions can easily be washed out, the difference between the degree of exhaustion and the degree of fixing being remarkably small, i.e. the soaping loss is very low. The dyestuffs of formula (I) are also particularly suitable for printing, above all on cotton, and similarly also for printing nitrogen-containing fibers, for example wool or silk or blended fabrics which contain wool or silk.

The dyeings and prints produced on cellulose fiber materials with the dyestuffs according to the invention have a good depth of color and a high fiber-dyestuff bonding stability both in the acid and in the alkaline range, and furthermore good light-fastness, good perspiration-light fastness and very good wet-fastness properties, such as fastnesses to washing, water, seawater, cross-dyeing and perspiration, as well as a good fastness to pleating, fastness to ironing and fastness to rubbing.

The Examples that follow serve to illustrate the invention, which are only illustrative, but not limiting. The compounds are depicted in the formulae are shown in the form of free acids; in general, they are prepared and isolated in the form of their alkali metal salts and used for dyeing in the form of their salts. In the same way it is possible to use the starting compounds and components mentioned in the form of free acids in the examples below in particular the Table of examples, in the synthesis as such or in the form of their salts, preferably alkali metal salts.

The Examples that follow serve to illustrate the invention. Parts and percentages are by weight, unless otherwise stated. Parts by weight bear the same relation to parts by volume as the kilogram to the liter.

The absorption maxima (λ max) in the visible region reported for the compounds according to the present invention were determined from aqueous solutions of alkali metal salts.

EXAMPLE 1

A solution containing 4-nitroaniline-2-sulfonic acid (21.8 parts) and a 35% aqueous solution of sodium nitrite (21.7 parts) in water (150 parts) was introduced into a solution containing ice water (300 parts) and concentrated hydrochloric acid (35.5 parts), while controlling the temperature at 0 to 5° C., and the mixture was stirred for 1 hour at this temperature to effect diazotization.

Successively, after excess nitrous acid had been decomposed, 2-amino-8-hydroxynaphthalene-3,6-disulfonic acid (31.9 parts) was added to the reaction mixture, and the mixture was stirred for 12 hours at room temperature, thereby performing a coupling reaction. Thereafter, the reaction mixture was adjusted to pH 8 to 10, and mixed with sodium sulfide (10.7 parts), and the mixture was heated to 60° C. and stirred for 3 hours at this temperature to effect reduction of the nitro group. Then, the reaction mixture was mixed with sodium chloride (40 parts) to deposit crystals, which were collected on a filter and washed. The resulting wet cake was dissolved in water (400 parts). The solution was mixed with cyanuric chloride (16.7 parts), and the mixture was stirred for 5 hours at 0 to 10° C., while controlling the pH within a range of 4 to 5 using a 20% aqueous solution of sodium carbonate, thereby performing a first condensation compound of formula (1).

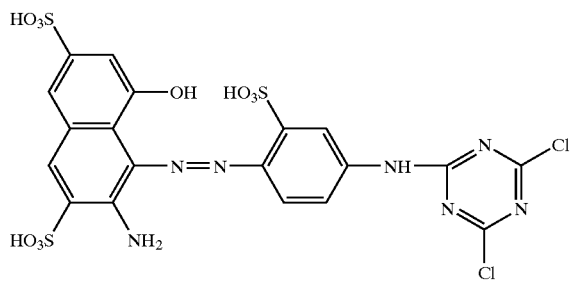

(1)

EXAMPLE 2

To a solution containing the compound of Example 1 was added 27.8 parts of 1-N-ethylaminobenzene-3-β-sulfatoethylsulfone. The mixture was heated to 55° C., and was maintained at pH 4 to 5 for 5 hours.

To the resulting solution was added sodium chloride to precipitate the desired product of formula (2), (λmax=525 nm), 11  1-N-β-carbamoylethylaminobenzene-4-β-sulfatoethylsulfone
12  1-N-β-carbamoylethylaminobenzene-2-β-sulfatoethylsulfone
13  1-N-β-carbamoylmethylamino-4-methoxybenzene-3-β-sulfatoethylsulfone
14  1-N-n-propylaminobenzene-3-β-sulfatoethylsulfone
15  1-N-n-propylaminobenzene-4-β-sulfatoethylsulfone
16  1-N-n-propylaminobenzene-2-β-sulfatoethylsulfone
17  1-N-n-propylamino-4-methoxybenzene-3-β-sulfatoethylsulfone
18  1-N-β-cyanoethylaminobenzene-3-β-sulfatoethylsulfone
19  1-N-β-cyanoethylaminobenzene-4-β-sulfatoethylsulfone
20  1-N-β-cyanoethylaminobenzene-2-β-sulfatoethylsulfone
21  1-N-β-cyanoethylamino-4-methoxybenzene-3-β-sulfatoethylsulfone
22  1-N-β-hydroxyethylaminobenzene-3-β-sulfatoethylsulfone
23  1-N-β-hydroxyethylaminobenzene-4-β-sulfatoethylsulfone
24  1-N-β-hydroxyethylaminobenzene-2-β-sulfatoethylsulfone
25  1-N-β-hydroxyethylamino-4-methoxybenzene-3-β-sulfatoethylsulfone
26  1-N-β-sulfatoethylaminobenzene-3-β-sulfatoethylsulfone
27  1-N-β-methoxycarbonylethylaminobenzene-3-β-sulfatoethylsulfone
28  1-N-ethylamino-2-methoxybenzene-5-β-sulfatoethylsulfone
29  1-N-ethylamino-2,4-dimethylbenzene-5-β-sulfatoethylsulfone
30  1-N-ethylamino-2-methoxy-5-methylbenzene-3-β-sulfatoethylsulfone

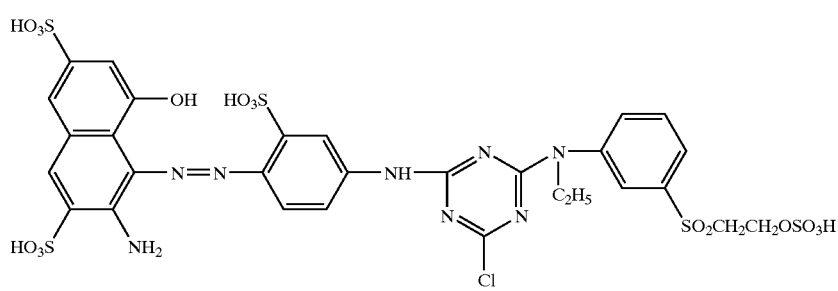

(2)

EXAMPLE 3 to 33

The procedure described in Example 2 is repeated, reacting the compound of Example 1 with the following compounds, 3 to 33. As a result, bluish red (525±2 nm) monoazo derivatives are obtained.

EXAMPLE
No.   Compound Used 3  1-N-ethylaminobenzene-4-β-sulfatoethylsulfone
4  1-N-ethylaminobenzene-2-β-sulfatoethylsulfone
5  1-N-ethylamino-4-methoxybenzene-3-β-sulfatoethylsulfone
6  1-N-methylaminobenzene-3-β-sulfatoethylsulfone
7  1-N-methylaminobenzene-4-β-sulfatoethylsulfone
8  1-N-methylaminobenzene-2-β-sulfatoethylsulfone
9  1-N-methylamino-4-methoxybenzene-3-β-sulfatoethylsulfone
10  1-N-β-carbamoylethylaminobenzene-3-β-sulfatoethylsulfone 31  1-N-ethylaminonaphthalene-6-β-sulfatoethylsulfone
32  1-N-ethylamino-8-sulfonaphthalene-6-β-sulfatoethylsulfone
33  1-N-methylaminonaphthalene-8-β-sulfatoethylsulfone

EXAMPLE 34

To a solution containing the compound of Example 1 was added an aqueous solution of 3.78 parts of cyanamide in about 100 parts of water, and the mixture is heated to 40~60° C. and maintained at a pH 8 to 10 by means of a 20% aqueous solution of sodium carbonate until the reaction has ended, after 6 to 7 hours to give the monochlorotriazine of formula (34):

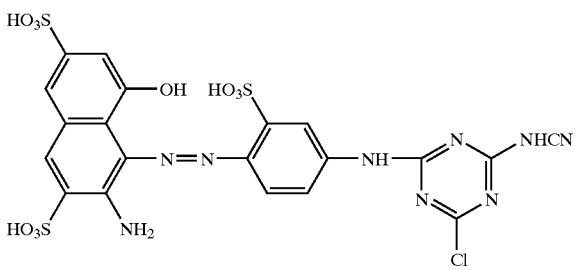

(34)

EXAMPLE 35

To a solution containing the product of Example 34 are added 25.3 parts of 1-aminobenzeze-3-β-sulfatoethylsulfone. The mixture is heated to 55° C., and is maintained at pH 4 to 6 for 4 hours.

To the resulting solution is added sodium chloride to precipitate the desired product of formula (35), (λmax=525 nm).

49 1-N-n-propylaminobenzene-2-β-sulfatoethylsulfone
50 1-N-n-propylamino-4-methoxybenzene-3-β-sulfatoethylsulfone
51 1-N-β-cyanoethylaminobenzene-3-β-sulfatoethylsulfone
52 1-N-β-cyanoethylaminobenzene-4-β-sulfatoethylsulfone
53 1-N-β-cyanoethylaminobenzene-2-β-sulfatoethylsulfone
54 1-N-β-cyanoethylamino-4-methoxybenzene-3-β-sulfatoethylsulfone
55 1-N-β-hydroxyethylaminobenzene-3-β-sulfatoethylsulfone
56 1-N-β-hydroxyethylaminobenzene-4-β-sulfatoethylsulfone
57 1-N-β-hydroxyethylaminobenzene-2-β-sulfatoethylsulfone
58 1-N-β-hydroxyethylamino-4-methoxybenzene-3-β-sulfatoethylsulfone
59 1-N-β-sulfatoethylaminobenzene-3-β-sulfatoethylsulfone
60 1-N-β-methoxycarbonylethylaminobenzene-3-β-sulfatoethylsulfone
61 1-N-ethylamino-2-methoxybenzene-5-β-sulfatoethylsulfone
62 1-N-ethylamino-2,4-dimethylbenzene-5-β-sulfatoethylsulfone
63 1-N-ethylamino-2-methoxy-5-methylbenzene-3-β-sulfatoethylsulfone

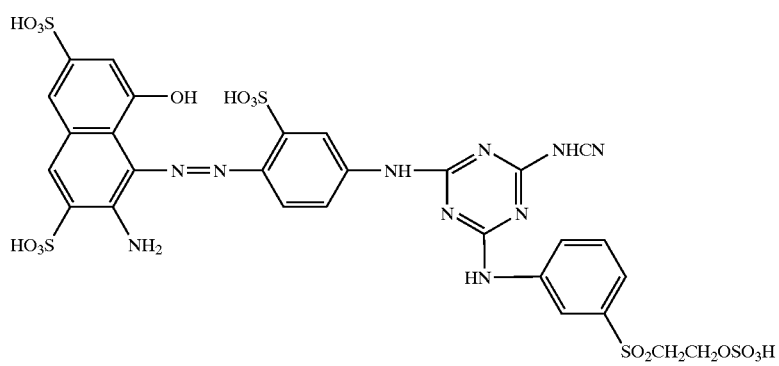

(35)

EXAMPLE 36 to 76

A procedure similar to that described in Example 35 is repeated; a solution containing the product of Example 34 is reacted with compound listed below (Examples 36 to 76)

EXAMPLE
No.  Compound Used 36 1-N-ethylaminobenzene-4-β-sulfatoethylsulfone
37 1-N-ethylaminobenzene-2-β-sulfatoethylsulfone
38 1-N-ethylamino-4-methoxybenzene-3-β-sulfatoethylsulfone
39 1-N-methylaminobenzene-3-β-sulfatoethylsulfone
40 1-N-methylaminobenzene-4-β-sulfatoethylsulfone
41 1-N-methylaminobenzene-2-β-sulfatoethylsulfone
42 1-N-methylamino-4-methoxybenzene-3-β-sulfatoethylsulfone
43 1-N-β-carbamoylethylaminobenzene-3-β-sulfatoethylsulfone
44 1-N-β-carbamoylethylaminobenzene-4-β-sulfatoethylsulfone
45 1-N-β-carbamoylethylaminobenzene-2-β-sulfatoethylsulfone
46 1-N-β-carbamoylmethylamino-4-methoxybenzene-3-β-sulfatoethylsulfone
47 1-N-n-propylaminobenzene-3-β-sulfatoethylsulfone
48 1-N-n-propylaminobenzene-4-β-sulfatoethylsulfone
64 1-N-ethylaminonaphthalene-6-β-sulfatoethylsulfone
65 1-N-ethylamino-8-sulfonaphthalene-6-β-sulfatoethylsulfone
66 1-N-methylaminonaphthalene-8-β-sulfatoethylsulfone
67 1-aminobenzene-4-β-sulfatoethylsulfone
68 1-aminobenzene-2-β-sulfatoethylsulfone
69 1-N-ethylaminobenzene-3-β-sulfatoethylsulfone
70 1-amino-4-methoxybenzene-3-β-sulfatoethylsulfone
71 1-amino-2-methoxybenzene-5-β-sulfatoethylsulfone
72 1-amino-2-methoxy-5-methylbenzene-4-β-sulfatoethylsulfone
73 1-amino-2,4-dimethylbenzene-5-β-sulfatoethylsulfone
74 1-aminonaphthalene-6-β-sulfatoethylsulfone
75 1-amino-8-sulfonaphthalene-6-β-sulfatoethylsulfone
76 1-aminonaphthalene-8-β-sulfatoethylsulfone

EXAMPLE 77

To a solution containing the compound of Example 1 was added 25.3 parts of 1-aminobenzene-3-β-sulfatoethylsulfone. The mixture was heated to 55° C., and maintained at pH 4 to 5 for 5 hours. To this reaction mixture was added 18.5 parts of 3-carboxypyridine, and the mixture is heated to 85~90° C., and is maintained at pH 4 to 5 for 12 hours.

To the resulting solution is added sodium chloride to precipitate the desired product of formula (77), (λmax=528 nm), (77)

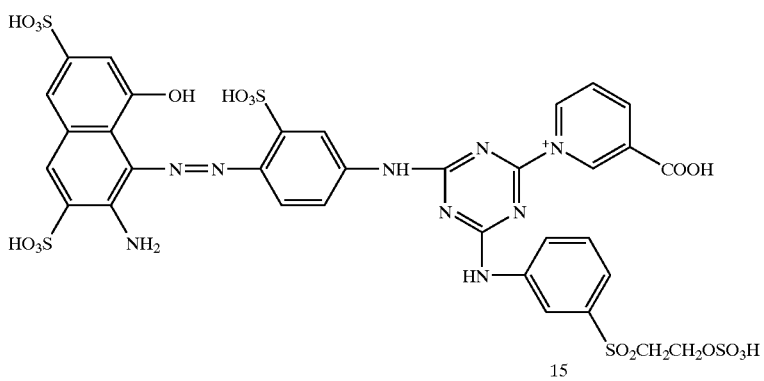

EXAMPLE 78~118

A procedure similar to that described in Example 77 is repeated using the substituents listed in examples 78 to 118 instead of 1-aminobenzene-3-β-sulfatoethylsulfone that used in Examples 77. As a result, bluish red (528±2 nm) monoazo derivatives are obtained.

EXAMPLE
No. Compound Used 78 1-N-ethylaminobenzene-4-β-sulfatoethylsulfone
79 1-N-ethylaminobenzene-2-β-sulfatoethylsulfone
80 1-N-ethylamino-4-methoxybenzene-3-β-sulfatoethylsulfone
81 1-N-methylaminobenzene-3-β-sulfatoethylsulfone
82 1-N-methylaminobenzene-4-β-sulfatoethylsulfone
83 1-N-methylaminobenzene-2-β-sulfatoethylsulfone
84 1-N-methylamino-4-methoxybenzene-3-β-sulfatoethylsulfone
85 1-N-β-carbamoylethylaminobenzene-3-β-sulfatoethylsulfone
86 1-N-β-carbamoylethylaminobenzene-4-β-sulfatoethylsulfone
87 1-N-β-carbamoylethylaminobenzene-2-β-sulfatoethylsulfone
88 1-N-β-carbamoylmethylamino-4-methoxybenzene-3-β-sulfatoethylsulfone
89 1-N-n-propylaminobenzene-3-β-sulfatoethylsulfone
90 1-N-n-propylaminobenzene-4-β-sulfatoethylsulfone
91 1-N-n-propylaminobenzene-2-β-sulfatoethylsulfone
92 1-N-n-propylamino-4-methoxybenzene-3-β-sulfatoethylsulfone
93 1-N-β-cyanoethylaminobenzene-3-β-sulfatoethylsulfone
94 1-N-β-cyanoethylaminobenzene-4-β-sulfatoethylsulfone
95 1-N-β-cyanoethylaminobenzene-2-β-sulfatoethylsulfone
96 1-N-β-cyanoethylamino-4-methoxybenzene-3-β-sulfatoethylsulfone
97 1-N-β-hydroxyethylaminobenzene-3-β-sulfatoethylsulfone
98 1-N-β-hydroxyethylaminobenzene-4-β-sulfatoethylsulfone
99 1-N-β-hydroxyethylaminobenzene-2-β-sulfatoethylsulfone
100 1-N-β-hydroxyethylamino-4-methoxybenzene-3-β-sulfatoethylsulfone
101 1-N-β-sulfatoethylaminobenzene-3-β-sulfatoethylsulfone
102 1-N-β-methoxycarbonylethylaminobenzene-3-β-sulfatoethylsulfone
103 1-N-ethylamino-2-methoxybenzene-5-β-sulfatoethylsulfone
104 1-N-ethylamino-2,4-dimethylbenzene-5-β-sulfatoethylsulfone
105 1-N-ethylamino-2-methoxy-5-methylbenzene-3-β-sulfatoethylsulfone
106 1-N-ethylaminonaphthalene-6-β-sulfatoethylsulfone
107 1-N-ethylamino-8-sulfonaphthalene-6-β-sulfatoethylsulfone
108 1-N-methylaminonaphthalene-8-β-sulfatoethylsulfone
109 1-aminobenzene-4-β-sulfatoethylsulfone
110 1-aminobenzene-2-β-sulfatoethylsulfone
111 1-N-ethylaminobenzene-3-β-sulfatoethylsulfone
112 1-amino-4-methoxybenzene-3-β-sulfatoethylsulfone
113 1-amino-2-methoxybenzene-5-β-sulfatoethylsulfone
114 1-amino-2-methoxy-5-methylbenzene-4-β-sulfatoethylsulfone
115 1-amino-2,4-dimethylbenzene-5-β-sulfatoethylsulfone
116 1-aminonaphthalene-6-β-sulfatoethylsulfone
117 1-amino-8-sulfonaphthalene-6-β-sulfatoethylsulfone
118 1-aminonaphthalene-8-3-sulfatoethylsulfone

EXAMPLE 119

A solution containing 4-nitroaniline-2-sulfonic acid (21.8 parts) and a 35% aqueous solution of sodium nitrite (21.7 parts) in water (150 parts) was introduced into a solution containing ice water (300 parts) and concentrated hydrochloric acid (35.5 parts), while controlling the temperature at 0 to 5° C., and the mixture was stirred for 1 hour at this temperature to effect diazotization.

Successively, after excess nitrous acid had been decomposed, 2-N-methylamino-8-hydroxynaphthalene-3,6-disulfonic acid (33.3 parts) was added to the reaction mixture, and the mixture was stirred for 12 hours at room temperature, thereby performing a coupling reaction. Thereafter, the reaction mixture was adjusted to pH 8 to 10, and mixed with sodium sulfide (10.7 parts), and the mixture was heated to 60° C. and stirred for 3 hours at this temperature to effect reduction of the nitro group. Then, the reaction mixture was mixed with sodium chloride (40 parts) to deposit crystals, which were collected and washed. The resulting wet cake was dissolved in water (400 parts). The solution was mixed with cyanuric chloride (16.7 parts), and the mixture was stirred for 5 hours at 0 to 10° C., while controlling the pH within a range of 4 to 5 using a 20% aqueous solution of sodium carbonate, thereby performing a first condensation. To this reaction mixture was added an aqueous solution of 3.78 parts of cyanamide in about 100 parts of water, and the mixture is heated to 40~60° C. and maintained at a pH 8.0 to 10.0 by means of a 20% aqueous solution of sodium carbonate until the reaction has ended after 6 to 7 hours, thereby performing a second condensation.

25.3 parts of 1-aminobenzeze-3-β-sulfatoethylsulfone were added to the above reaction mixture, and the resulting mixture was heated to 55° C., and maintained at pH 4 to 6 for 4 hours. To the resulting solution was added sodium chloride to precipitate the desired product of formula (119), (λmax=530 nm).

(119)

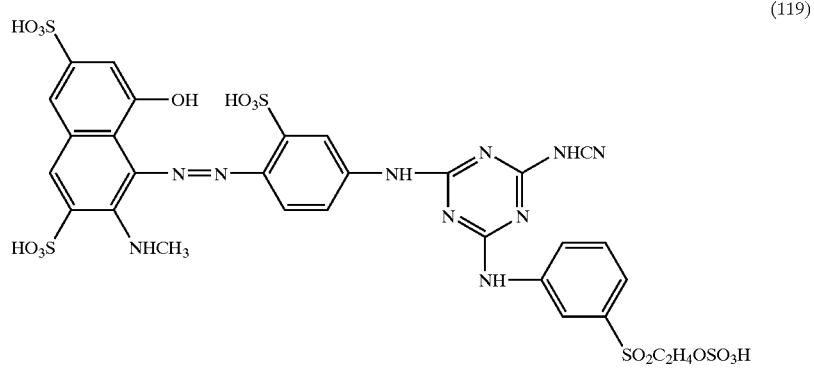

EXAMPLE 120 to 193

In similar manner compounds (120) to (193) were prepared. Each naphthol compound of formula(XI) shown in a second column of the following table was used in place of 2-N-methylamino-8-hydroxynaphalene-3,6-disulfonic acid, and each compound of the formula (X) shown in a third column in place of 4-nitroaniline-2-sulfonic acid, cyanamide as shown in a fourth column, and each aromatic amine compound of the formula(VIII) shown in a fifth column in place of 1-aminobenzeze-3-β-sulfatoethylsulfone, thereby obtaining the desired corresponding monoazo compound.

| Ex. No. | Compound of Formula (V) | Compound of Formula (IX) |
|---|---|---|
| 120 | 4,5-dihydroxy-7-NHCH₃-naphthalene-2,6-disulfonic structure (OH, NHCH₃, HO₃S, SO₃H) | 2-HO₃S-4-NO₂-aniline |
| 121 | same naphthol structure | 2-HOOC-4-NO₂-aniline |
| 122 | same naphthol structure | 2-HO₃S-4-NO₂-aniline |
| 123 | same naphthol structure | 2-H₃CO-4-NO₂-aniline |
| 124 | same naphthol structure | 2-HO₃S-4-NO₂-aniline |
| 125 | same naphthol structure | 2-HO₃S-4-NO₂-aniline |

-continued
| | | |
|---|---|---|
| 126 | 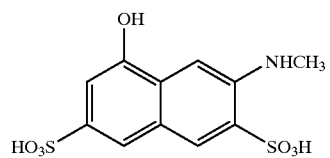 | 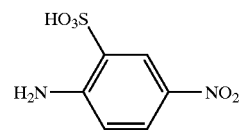 |
| 127 | 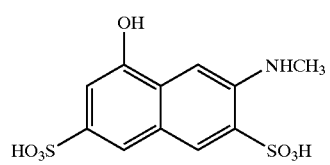 | 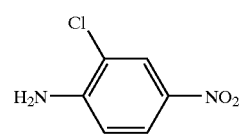 |
| 128 | 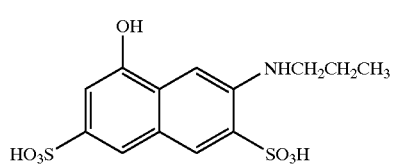 | 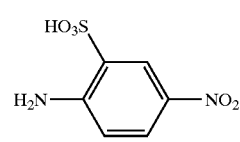 |
| 129 | 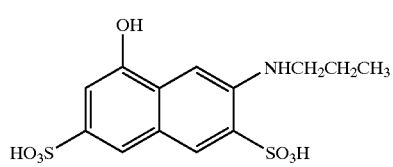 | 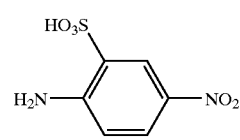 |
| 130 | 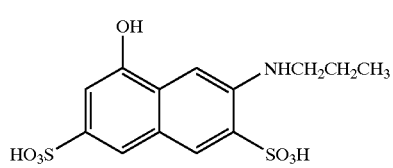 | 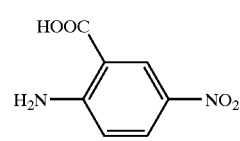 |
| 131 | 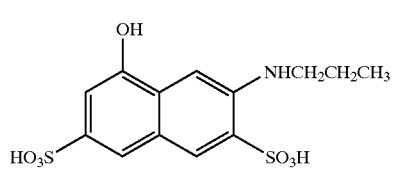 | 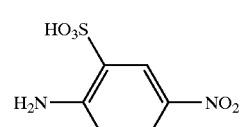 |
| 132 | 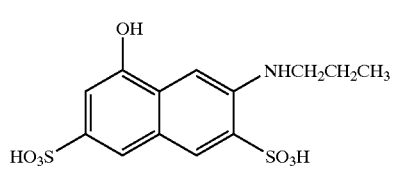 | 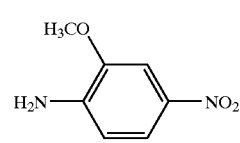 |
| 133 | 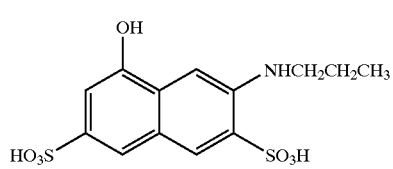 | 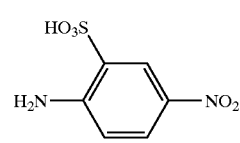 |
| 134 | 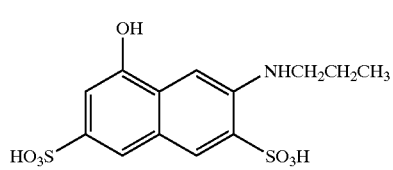 | 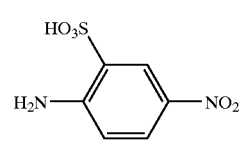 |

-continued
| | | |
|---|---|---|
| 135 | 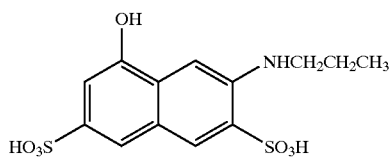 | 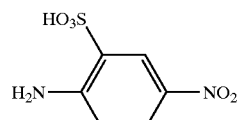 |
| 136 | 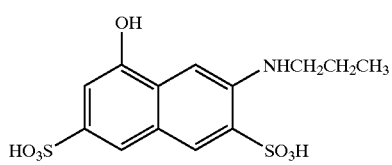 | 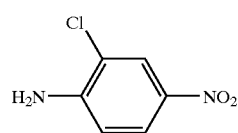 |
| 137 | 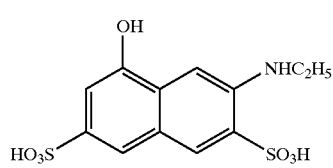 | 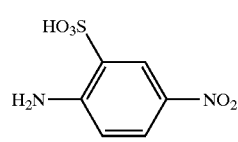 |
| 138 | 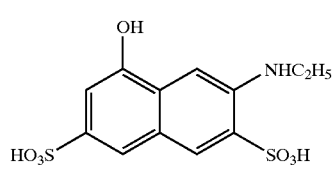 | 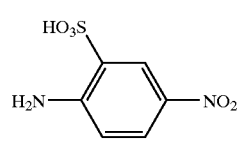 |
| 139 | 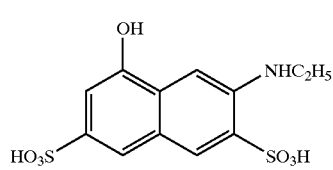 | 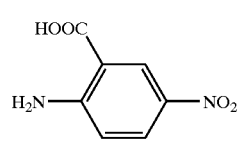 |
| 140 | 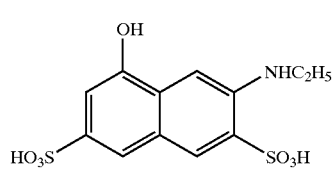 | 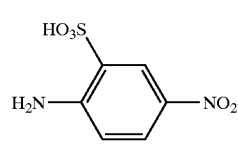 |
| 141 | 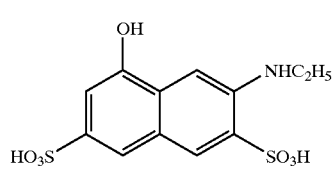 | 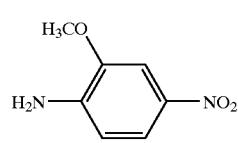 |
| 142 | 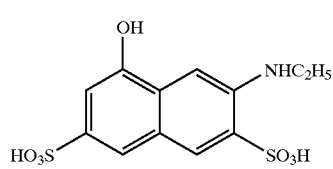 | 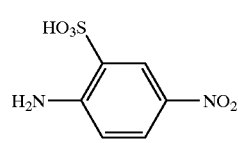 |
| 143 | 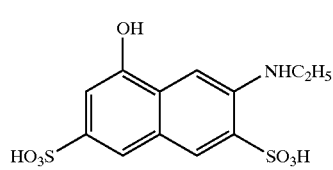 | 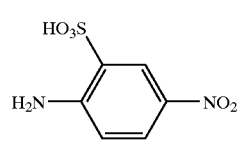 |

-continued
| | | |
|---|---|---|
| 144 | 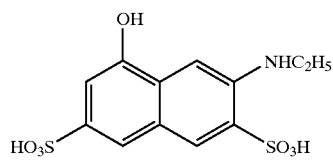 | 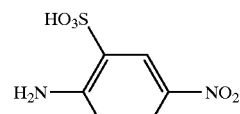 |
| 145 | 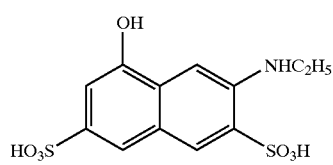 | 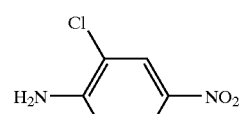 |
| 146 | 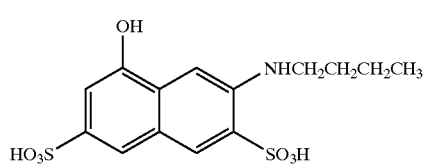 | 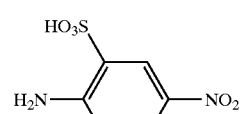 |
| 147 | 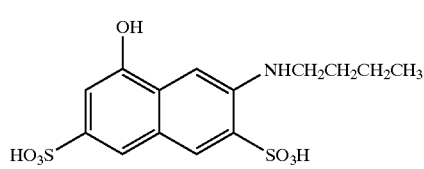 | 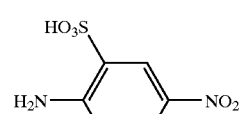 |
| 148 | 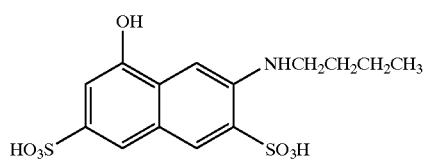 | 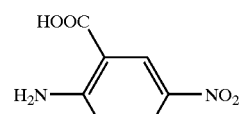 |
| 149 | 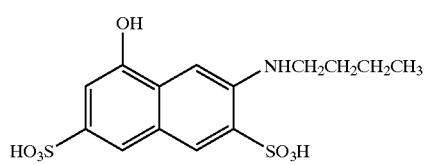 | 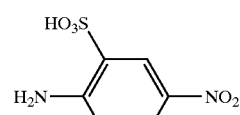 |
| 150 | 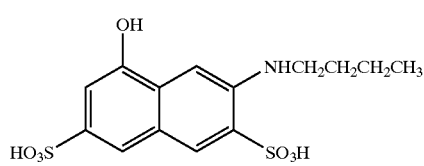 | 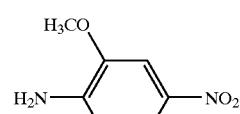 |
| 151 | 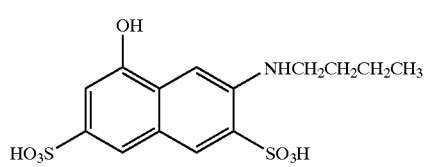 | 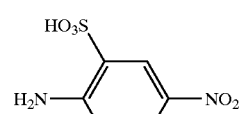 |
| 152 | 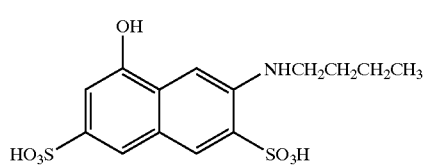 | 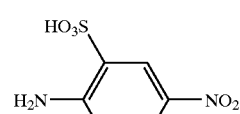 |

-continued
| | | |
|---|---|---|
| 153 | 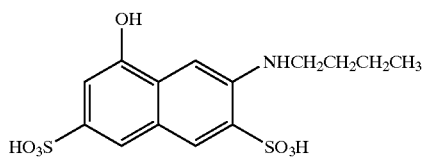 | 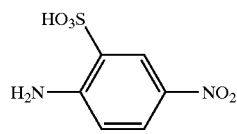 |
| 154 | 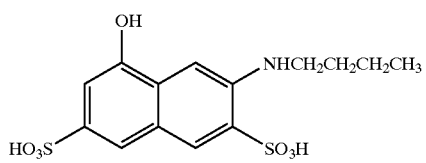 | 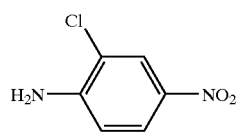 |
| 155 | 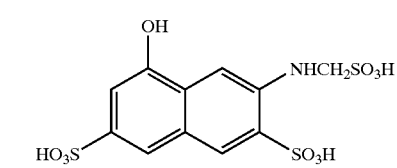 | 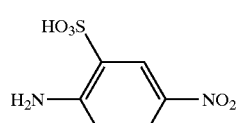 |
| 156 | 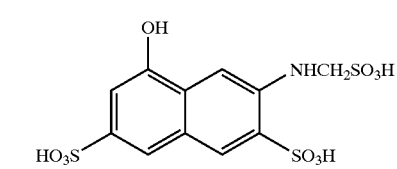 | 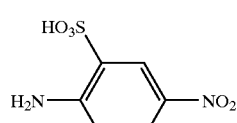 |
| 157 | 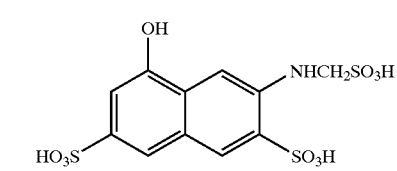 | 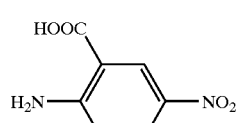 |
| 158 | 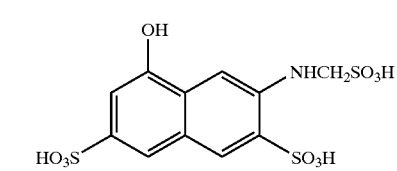 | 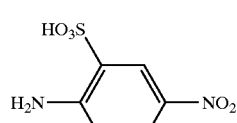 |
| 159 | 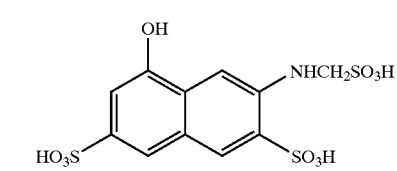 | 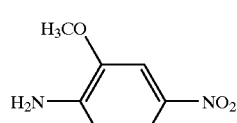 |
| 160 | 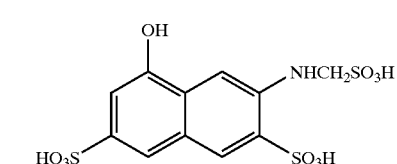 | 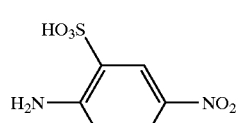 |
| 161 | 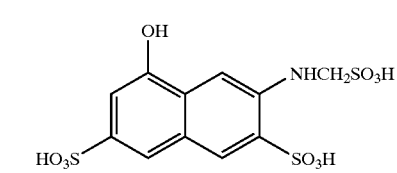 | 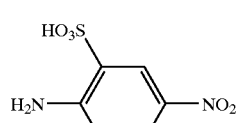 |

-continued
| | | |
|---|---|---|
| 162 | 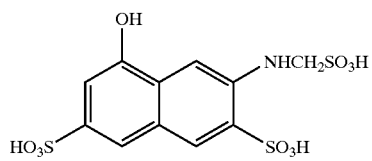 | 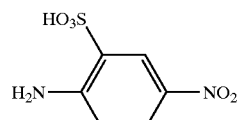 |
| 163 | 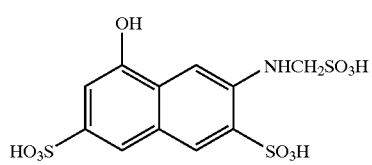 | 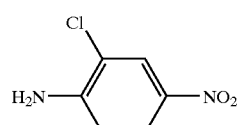 |
| 164 | 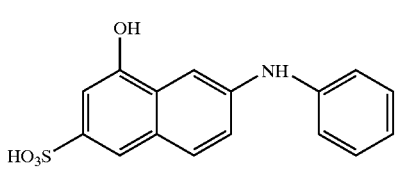 | 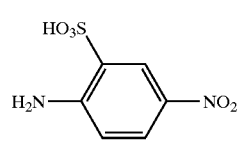 |
| 165 | 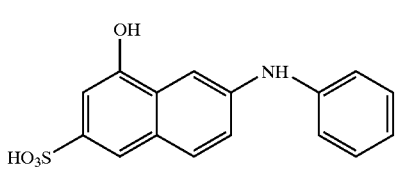 | 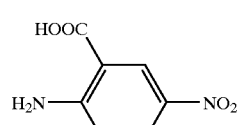 |
| 166 | 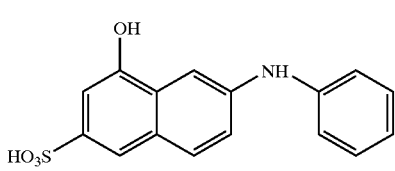 | 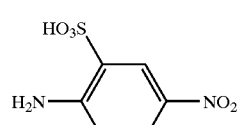 |
| 167 | 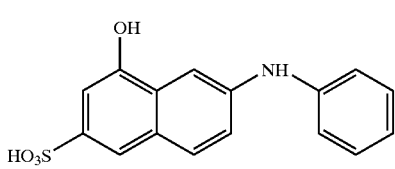 | 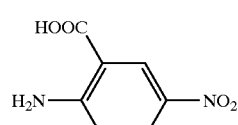 |
| 168 | 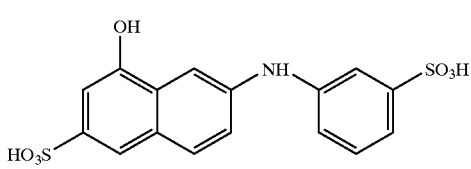 | 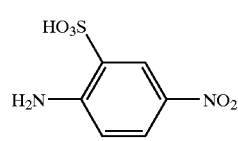 |
| 169 | 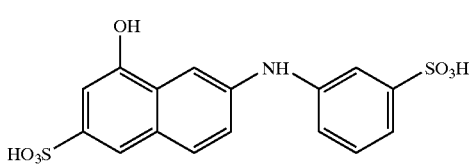 | 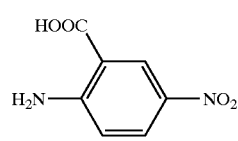 |
| 170 | 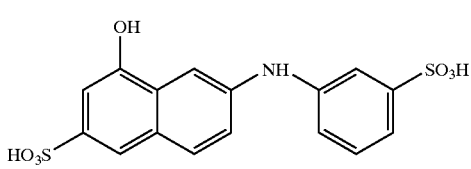 | 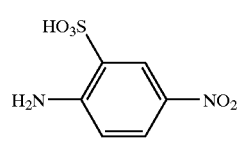 |

-continued
| | | |
|---|---|---|
| 171 | 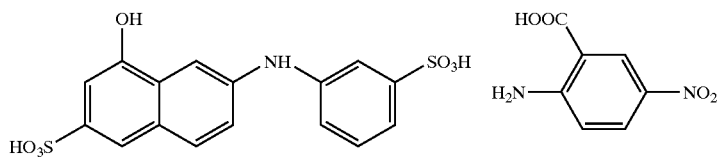 | 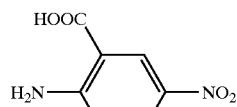 |
| 172 | 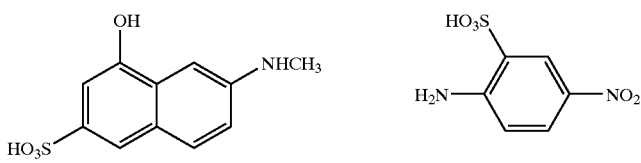 | 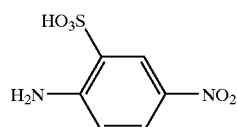 |
| 173 | 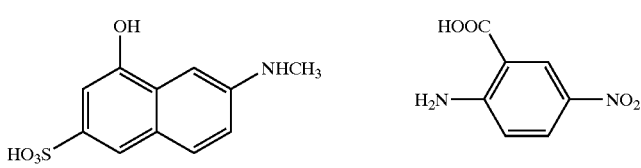 | 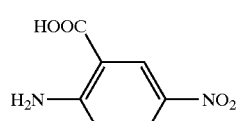 |
| 174 | 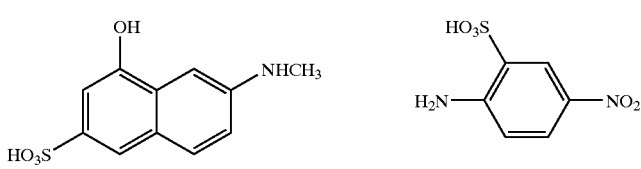 | 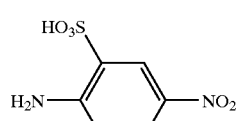 |
| 175 | 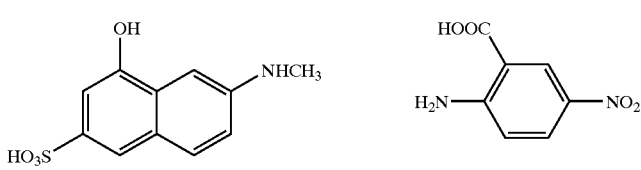 | 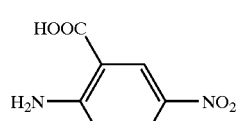 |
| 176 | 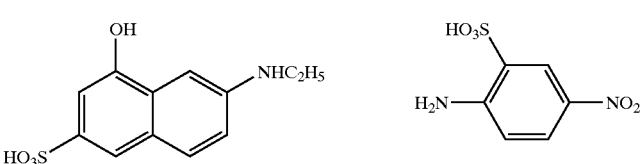 | 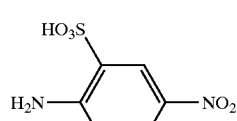 |
| 177 | 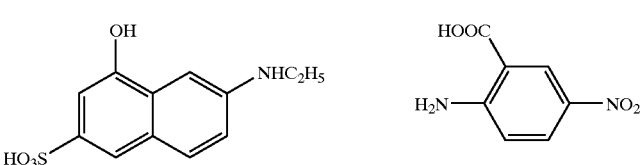 | 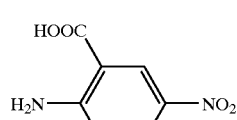 |
| 178 | 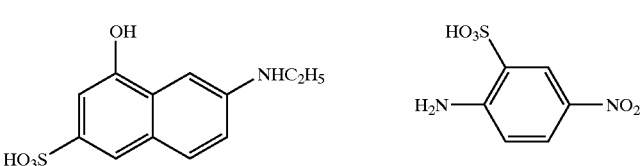 | 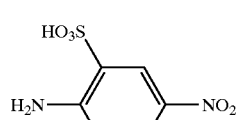 |
| 179 | 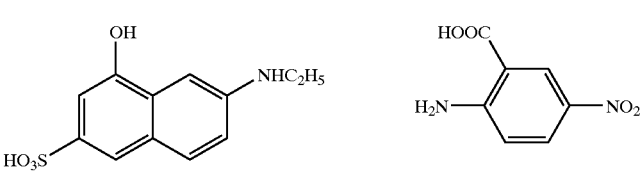 | 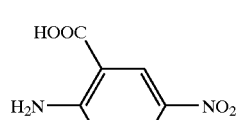 |

-continued
| | | |
|---|---|---|
| 180 | 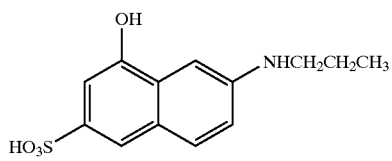 | 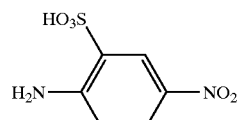 |
| 181 | 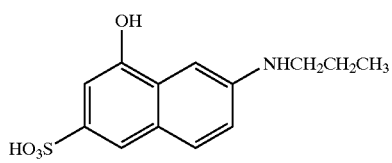 | 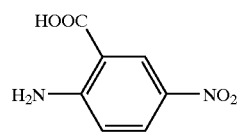 |
| 182 | 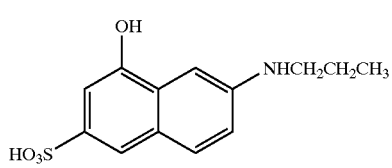 | 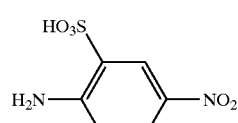 |
| 183 | 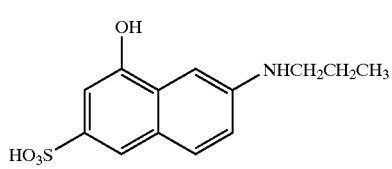 | 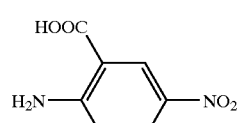 |
| 184 | 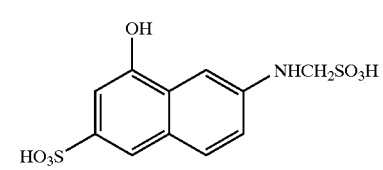 | 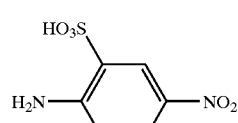 |
| 185 | 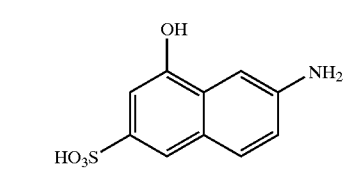 | 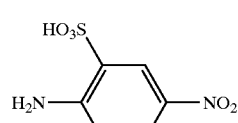 |
| 186 | 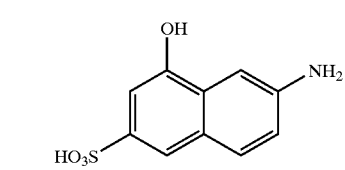 | 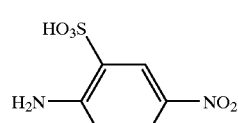 |
| 187 | 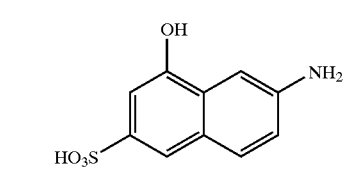 | 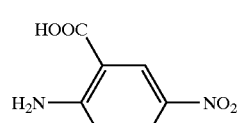 |
| 188 | 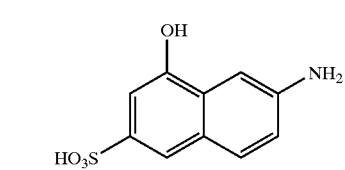 | 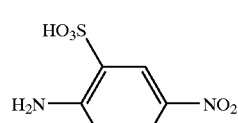 |

-continued
| | | |
|---|---|---|
| 189 | 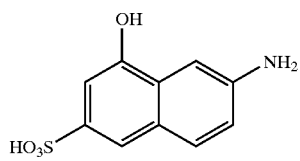 | 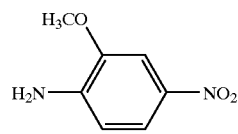 |
| 190 | 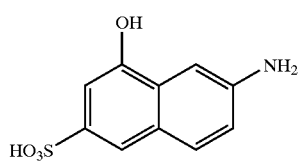 | 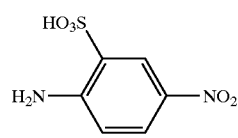 |
| 191 | 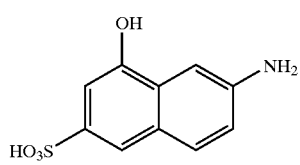 | 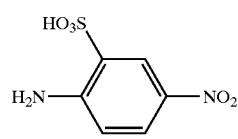 |
| 192 | 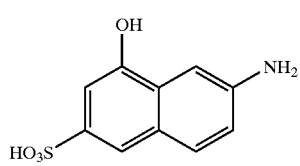 | 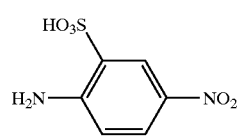 |
| 193 | 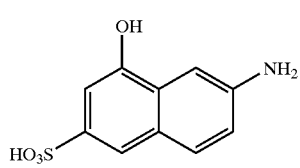 | 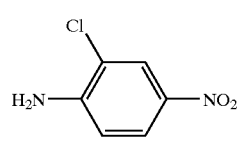 |
| Ex. No. | Cyanamide | Compound of Formula (III) | Shade |
|---|---|---|---|
| 120 | $NH_2CN$ | 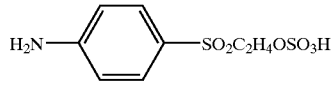 | Bluish red |
| 121 | $NH_2CN$ | 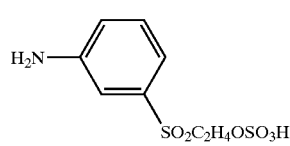 | Bluish red |
| 122 | $NH_2CN$ | 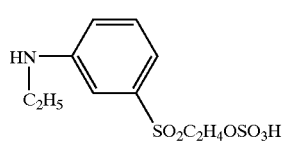 | Bluish red |
| 123 | $NH_2CN$ | 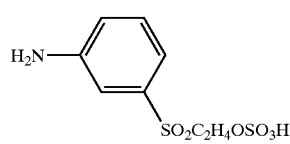 | Bluish red |
| 124 | $NH_2CN$ | 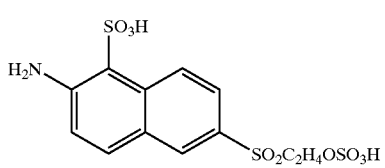 | Bluish red |

-continued
| | | | |
|---|---|---|---|
| 125 | NH$_2$CN |  | Bluish red |
| 126 | NH$_2$CN | 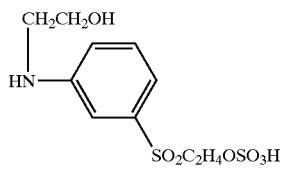 | Bluish red |
| 127 | NH$_2$CN | 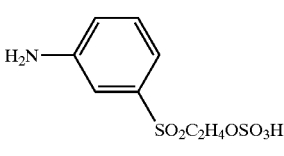 | Bluish red |
| 128 | NH$_2$CN | 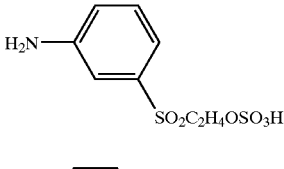 | Bluish red |
| 129 | NH$_2$CN | 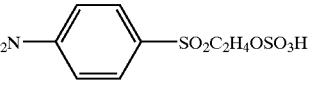 | Bluish red |
| 130 | NH$_2$CN | 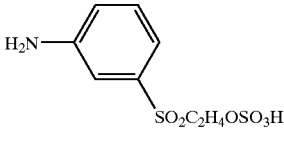 | Bluish red |
| 131 | NH$_2$CN | 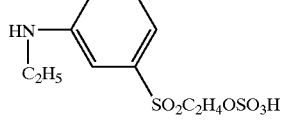 | Bluish red |
| 132 | NH$_2$CN | 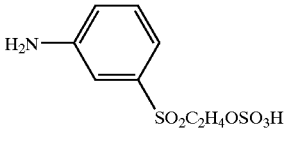 | Bluish red |
| 133 | NH$_2$CN | 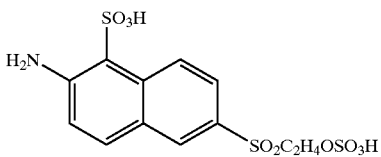 | Bluish red |
| 134 | NH$_2$CN | 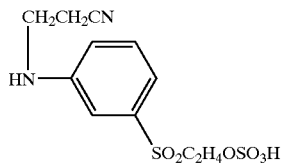 | Bluish red |

-continued

| | | | |
|---|---|---|---|
| 135 | NH$_2$CN |  3-(CH$_2$CH$_2$OH)NH-C$_6$H$_3$-SO$_2$C$_2$H$_4$OSO$_3$H | Bluish red |
| 136 | NH$_2$CN | 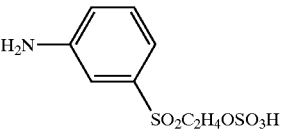 3-H$_2$N-C$_6$H$_4$-SO$_2$C$_2$H$_4$OSO$_3$H | Bluish red |
| 137 | NH$_2$CN | 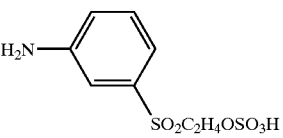 3-H$_2$N-C$_6$H$_4$-SO$_2$C$_2$H$_4$OSO$_3$H | Bluish red |
| 138 | NH$_2$CN | 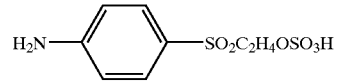 4-H$_2$N-C$_6$H$_4$-SO$_2$C$_2$H$_4$OSO$_3$H | Bluish red |
| 139 | NH$_2$CN | 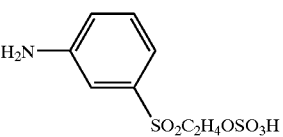 3-H$_2$N-C$_6$H$_4$-SO$_2$C$_2$H$_4$OSO$_3$H | Bluish red |
| 140 | NH$_2$CN | 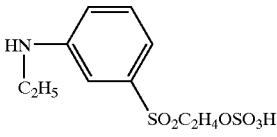 3-(C$_2$H$_5$)NH-C$_6$H$_3$-SO$_2$C$_2$H$_4$OSO$_3$H | Bluish red |
| 141 | NH$_2$CN | 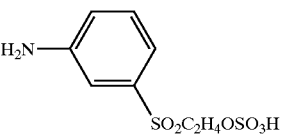 3-H$_2$N-C$_6$H$_4$-SO$_2$C$_2$H$_4$OSO$_3$H | Bluish red |
| 142 | NH$_2$CN | 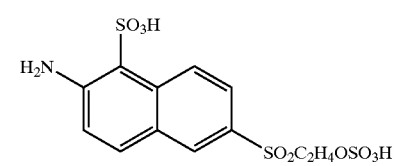 2-amino-1-SO$_3$H-6-SO$_2$C$_2$H$_4$OSO$_3$H-naphthalene | Bluish red |
| 143 | NH$_2$CN | 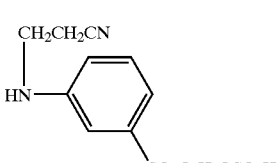 3-(CH$_2$CH$_2$CN)NH-C$_6$H$_3$-SO$_2$C$_2$H$_4$OSO$_3$H | Bluish red |
| 144 | NH$_2$CN | 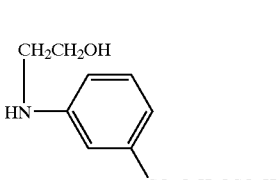 3-(CH$_2$CH$_2$OH)NH-C$_6$H$_3$-SO$_2$C$_2$H$_4$OSO$_3$H | Bluish red |

-continued

| | | | |
|---|---|---|---|
| 145 | NH₂CN | 3-H₂N-C₆H₄-SO₂C₂H₄OSO₃H | Bluish red |
| 146 | NH₂CN | 3-H₂N-C₆H₄-SO₂C₂H₄OSO₃H | Bluish red |
| 147 | NH₂CN | 4-H₂N-C₆H₄-SO₂C₂H₄OSO₃H | Bluish red |
| 148 | NH₂CN | 3-H₂N-C₆H₄-SO₂C₂H₄OSO₃H | Bluish red |
| 149 | NH₂CN | 3-(C₂H₅)HN-C₆H₄-SO₂C₂H₄OSO₃H | Bluish red |
| 150 | NH₂CN | 3-H₂N-C₆H₄-SO₂C₂H₄OSO₃H | Bluish red |
| 151 | NH₂CN | 2-amino-1-sulfo-6-(SO₂C₂H₄OSO₃H)-naphthalene | Bluish red |
| 152 | NH₂CN | 3-(NCCH₂CH₂)HN-C₆H₄-SO₂C₂H₄OSO₃H | Bluish red |
| 153 | NH₂CN | 3-(HOCH₂CH₂)HN-C₆H₄-SO₂C₂H₄OSO₃H | Bluish red |
| 154 | NH₂CN | 3-H₂N-C₆H₄-SO₂C₂H₄OSO₃H | Bluish red |

-continued
| 155 | NH$_2$CN | 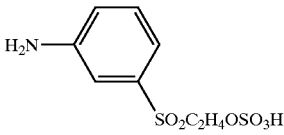 | Bluish red |
| 156 | NH$_2$CN | 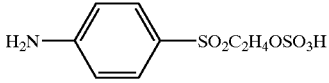 | Bluish red |
| 157 | NH$_2$CN | 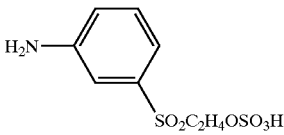 | Bluish red |
| 158 | NH$_2$CN | 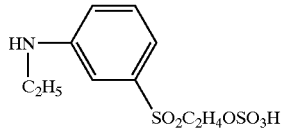 | Bluish red |
| 159 | NH$_2$CN | 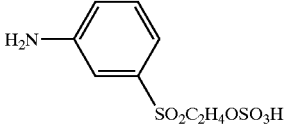 | Bluish red |
| 160 | NH$_2$CN | 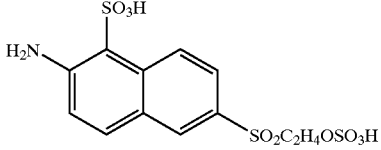 | Bluish red |
| 161 | NH$_2$CN |  | Bluish red |
| 162 | NH$_2$CN | 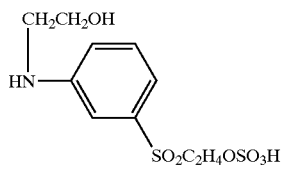 | Bluish red |
| 163 | NH$_2$CN | 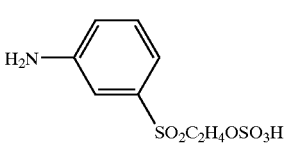 | Bluish red |
| 164 | NH$_2$CN | 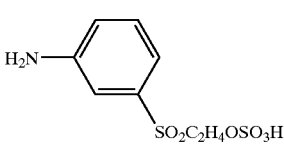 | Bluish red |

-continued
| | | | |
|---|---|---|---|
| 165 | NH$_2$CN | 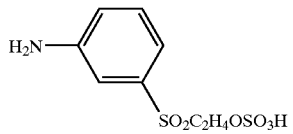 | Bluish red |
| 166 | NH$_2$CN | 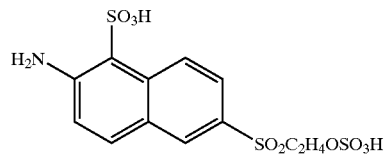 | Bluish red |
| 167 | NH$_2$CN | 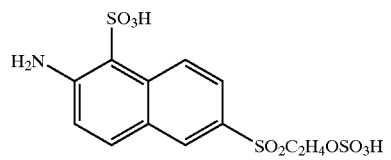 | Bluish red |
| 168 | NH$_2$CN | 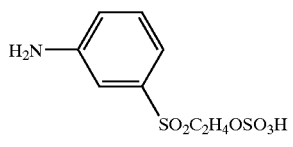 | Bluish red |
| 169 | NH$_2$CN | 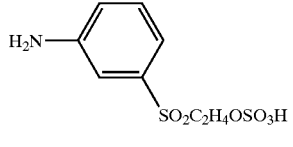 | Bluish red |
| 170 | NH$_2$CN | 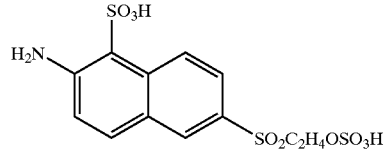 | Bluish red |
| 171 | NH$_2$CN | 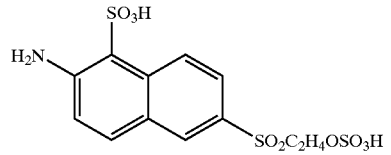 | Bluish red |
| 172 | NH$_2$CN | 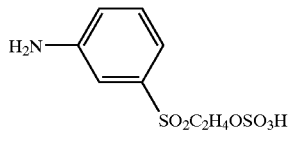 | Bluish red |
| 173 | NH$_2$CN | 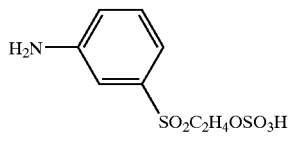 | Bluish red |
| 174 | NH$_2$CN | 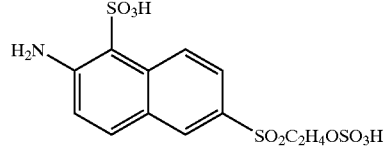 | Bluish red |

-continued
| | | | |
|---|---|---|---|
| 175 | NH$_2$CN | 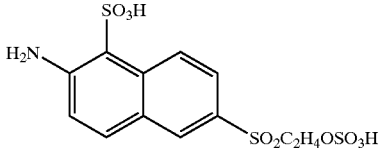 | Bluish red |
| 176 | NH$_2$CN | 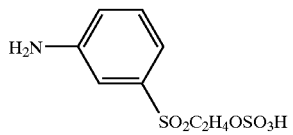 | Bluish red |
| 177 | NH$_2$CN | 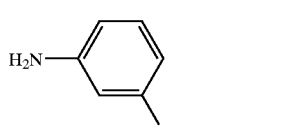 | Bluish red |
| 178 | NH$_2$CN | 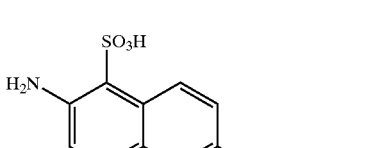 | Bluish red |
| 179 | NH$_2$CN | 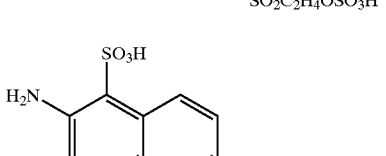 | Bluish red |
| 180 | NH$_2$CN | 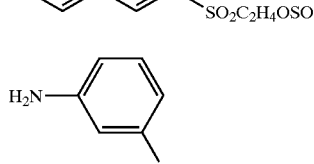 | Bluish red |
| 181 | NH$_2$CN | 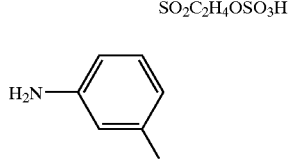 | Bluish red |
| 182 | NH$_2$CN | 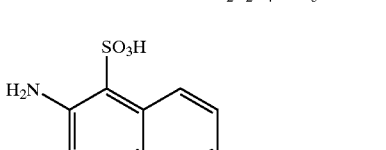 | Bluish red |
| 183 | NH$_2$CN | 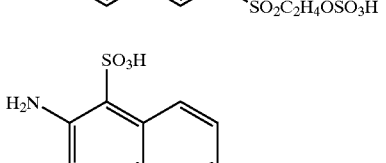 | Bluish red |
| 184 | NH$_2$CN | 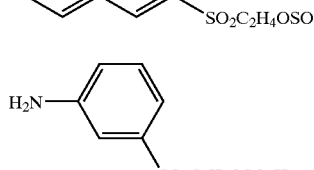 | Bluish red |

| | | | |
|---|---|---|---|
| 185 | NH₂CN | H₂N–C₆H₄(3-SO₂C₂H₄OSO₃H) | Bluish red |
| 186 | NH₂CN | H₂N–C₆H₄(4-SO₂C₂H₄OSO₃H) | Bluish red |
| 187 | NH₂CN | H₂N–C₆H₄(3-SO₂C₂H₄OSO₃H) | Bluish red |
| 188 | NH₂CN | (C₂H₅)HN–C₆H₄(3-SO₂C₂H₄OSO₃H) | Bluish red |
| 189 | NH₂CN | H₂N–C₆H₄(3-SO₂C₂H₄OSO₃H) | Bluish red |
| 190 | NH₂CN | 2-amino-1-sulfo-6-(β-sulfatoethylsulfonyl)naphthalene | Bluish red |
| 191 | NH₂CN | (NCCH₂CH₂)HN–C₆H₄(3-SO₂C₂H₄OSO₃H) | Bluish red |
| 192 | NH₂CN | (HOCH₂CH₂)HN–C₆H₄(3-SO₂C₂H₄OSO₃H) | Bluish red |
| 193 | NH₂CN | H₂N–C₆H₄(3-SO₂C₂H₄OSO₃H) | Bluish red |

EXAMPLE 194

To an aqueous mixture of the dichloro triazine described in example 119 was added 1-aminobenzeze-3-β-sulfatoethylsulfone (25.3 parts), and the mixture is heated to 55° C. and maintained at a pH 4 to 5 by means of a 20% aqueous solution of sodium carbonate until the reaction was complete after 3 to 5 hours.

18.5 parts of 3-carboxypyridine were added to the above reaction mixture, and the resulting mixture was heated to 85~90° C. at pH 4 to 5 for 12 hours. To the resulting solution was added sodium chloride to precipitate the desired product of formula (194), (λmax=535 nm).

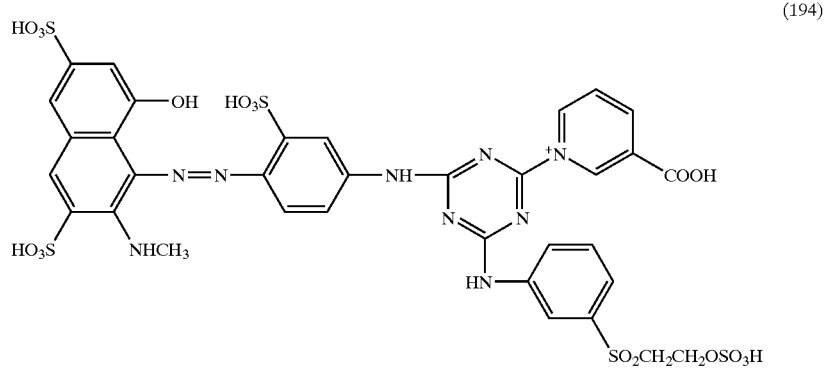

(194)

EXAMPLE 195 to 268

In a similar manner compounds (195) to (268) were prepared. Each naphthol compound of formula (XI) shown in a second column of the following table was used in place of 2-N-methylamino-8-hydroxynaphthalene-3,6-disulfonic acid, and each compound of the formula (X) shown in a third column in place of 4-nitroaniline-2-sulfonic acid, 3-carboxypyridine as shown in a fourth column, and each aromatic amine compound of the formula(VIII) shown in a fifth column in place of 1-aminobenzeze-3-β-sulfatoethylsulfone, thereby obtaining the desired corresponding monoazo compound.

| Ex. No. | Compound of Formula (XI) | Compound of Formula (X) |
|---|---|---|
| 195 | | |
| 196 | | |
| 197 | | |
| 198 | | |
| 199 | | |

-continued
| | | |
|---|---|---|
| 200 | 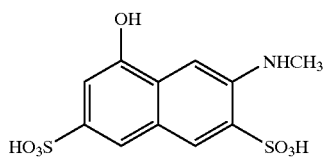 | 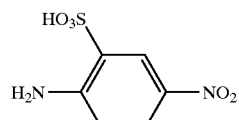 |
| 201 | 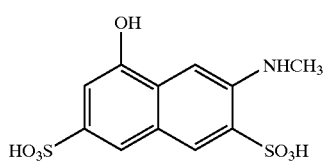 | 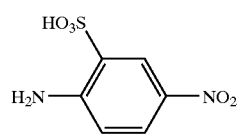 |
| 202 | 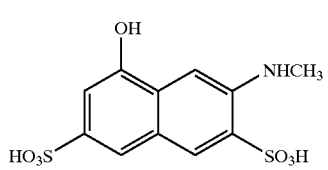 | 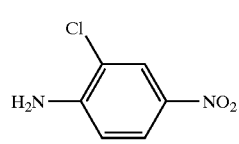 |
| 203 | 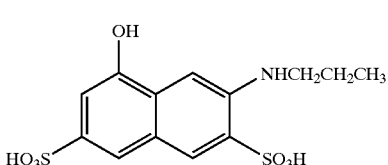 | 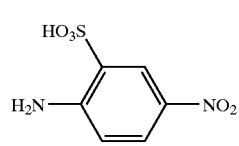 |
| 204 | 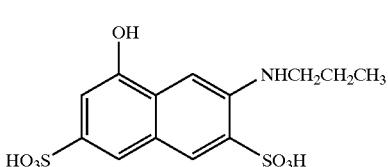 | 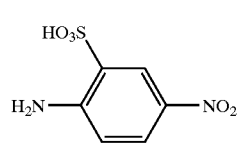 |
| 205 | 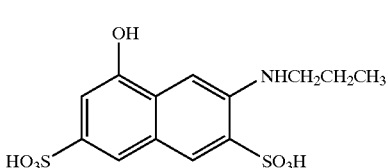 | 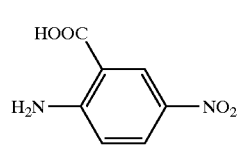 |
| 206 | 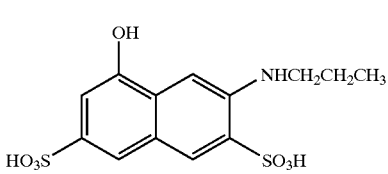 | 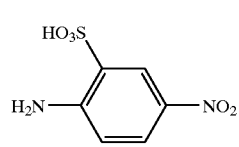 |
| 207 | 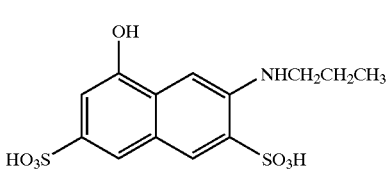 | 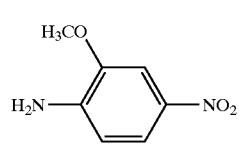 |
| 208 | 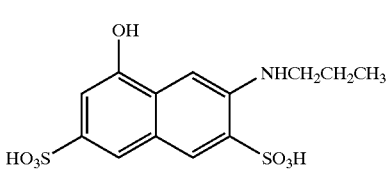 | 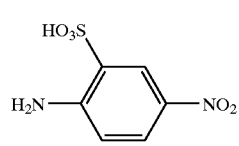 |

-continued
| | | |
|---|---|---|
| 209 | 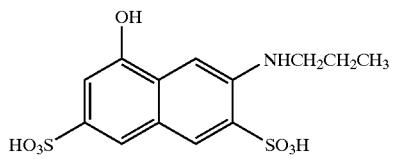 | 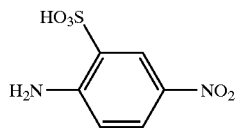 |
| 210 | 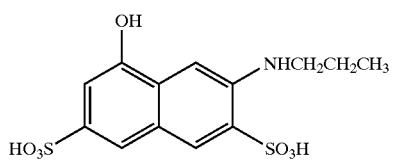 | 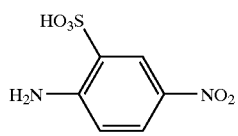 |
| 211 | 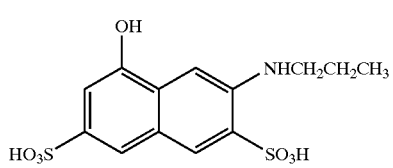 | 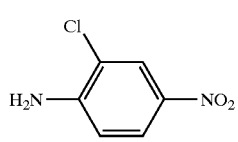 |
| 212 | 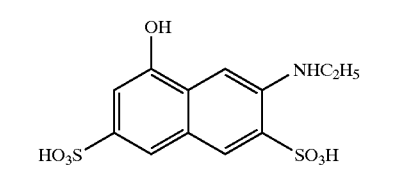 | 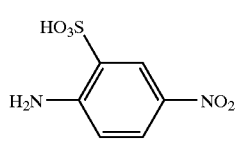 |
| 213 | 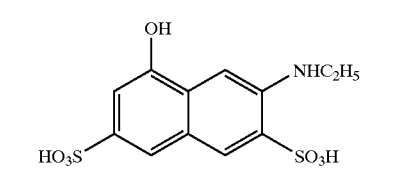 | 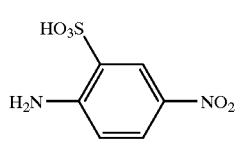 |
| 214 | 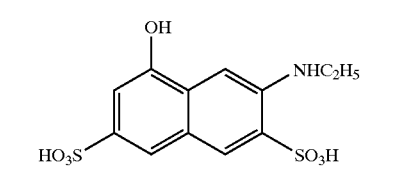 | 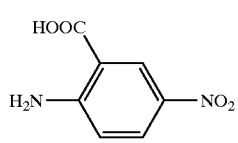 |
| 215 | 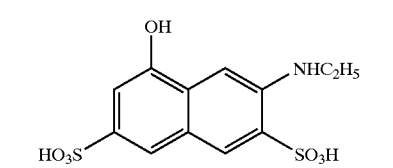 | 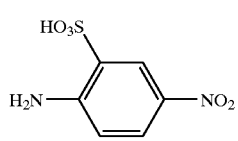 |
| 216 | 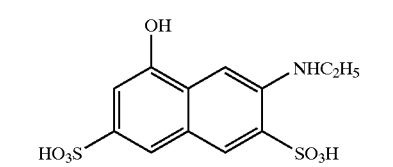 | 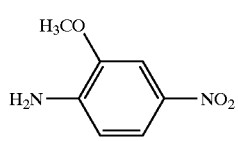 |
| 217 | 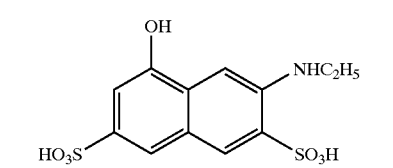 | 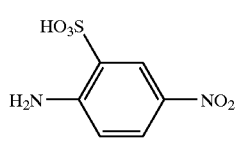 |

-continued
| | | |
|---|---|---|
| 218 | 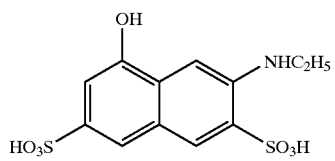 | 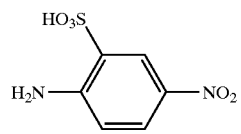 |
| 219 | 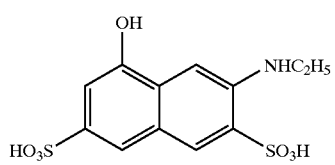 | 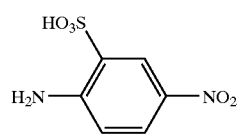 |
| 220 | 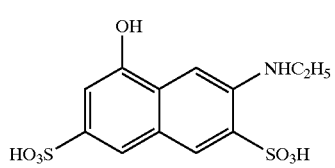 | 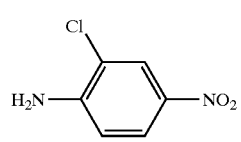 |
| 221 | 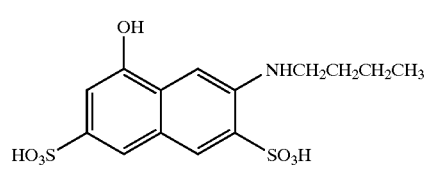 | 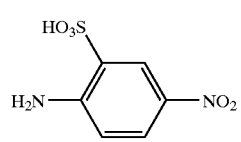 |
| 222 | 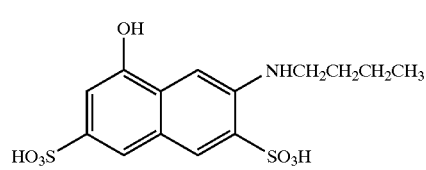 | 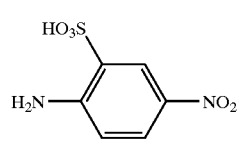 |
| 223 | 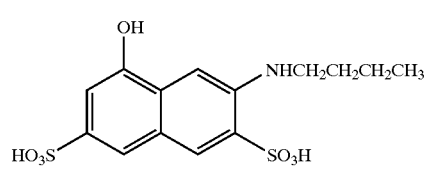 | 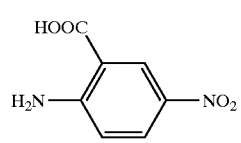 |
| 224 | 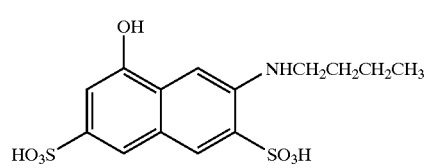 | 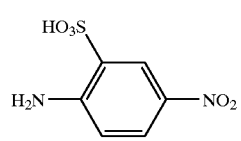 |
| 225 | 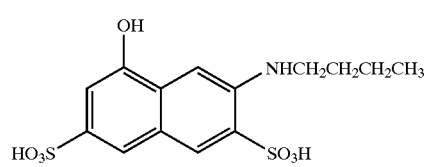 | 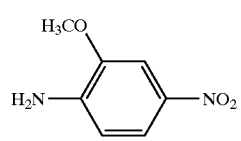 |
| 226 | 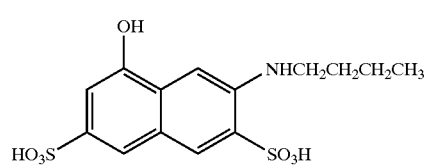 | 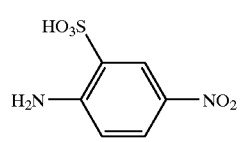 |

-continued
| | | |
|---|---|---|
| 227 | 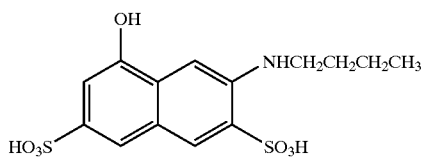 | 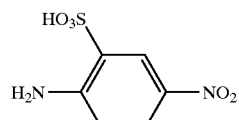 |
| 228 | 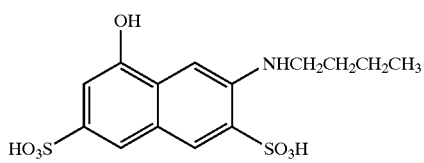 | 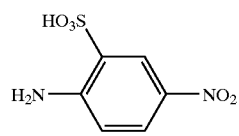 |
| 229 | 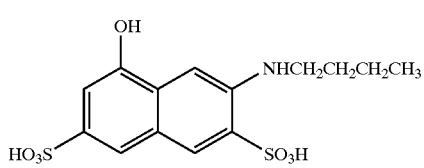 | 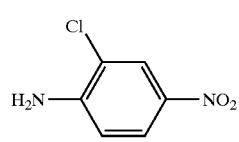 |
| 230 | 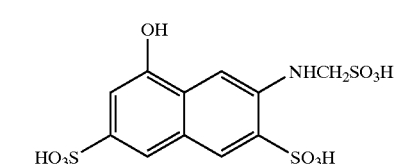 | 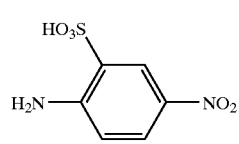 |
| 231 | 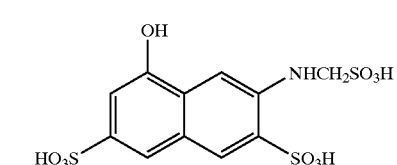 | 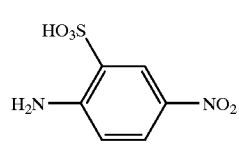 |
| 232 | 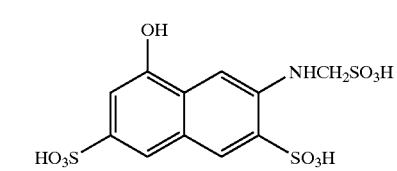 | 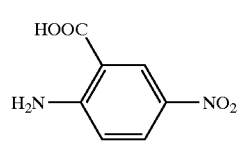 |
| 233 | 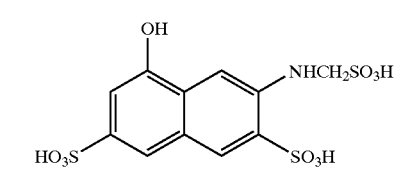 | 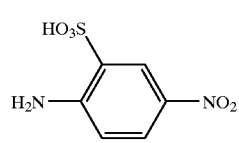 |
| 234 | 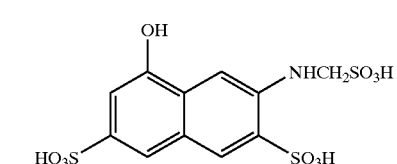 | 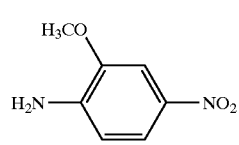 |
| 235 | 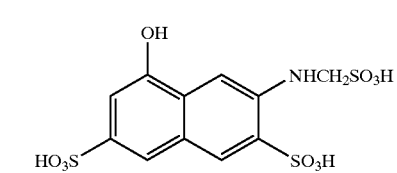 | 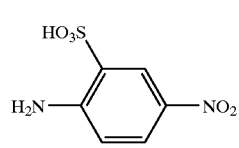 |

-continued
| | | |
|---|---|---|
| 236 | 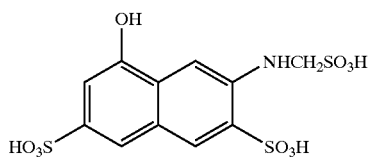 | 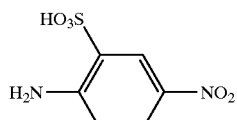 |
| 237 | 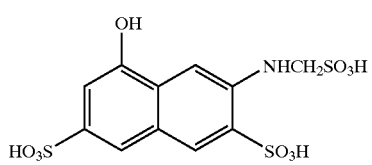 | 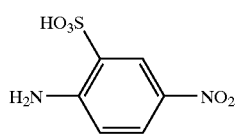 |
| 238 | 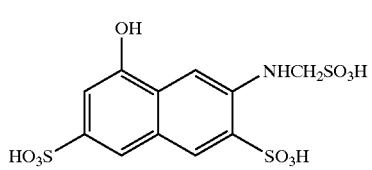 | 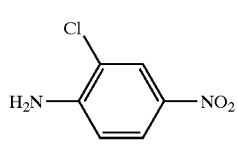 |
| 239 | 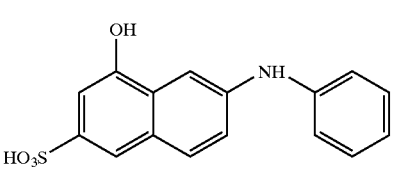 | 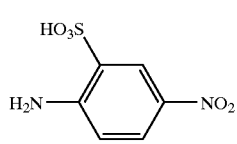 |
| 240 | 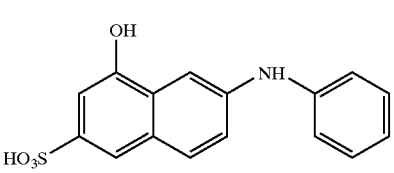 | 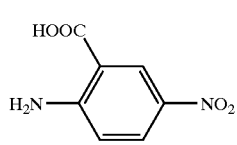 |
| 241 | 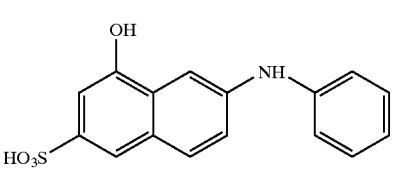 | 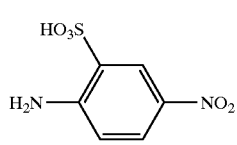 |
| 242 | 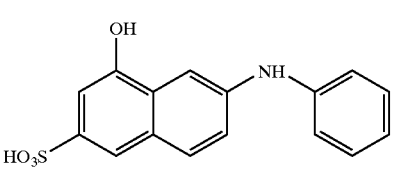 | 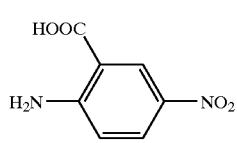 |
| 243 | 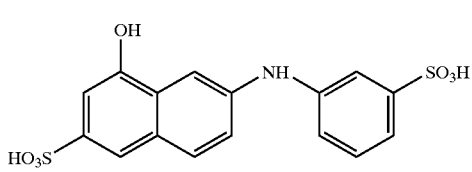 | 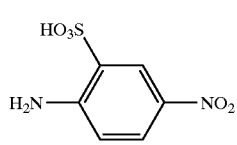 |
| 244 | 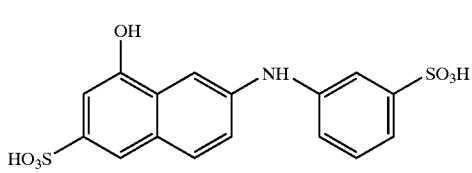 | 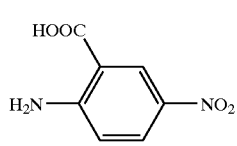 |

-continued
| | | |
|---|---|---|
| 245 | 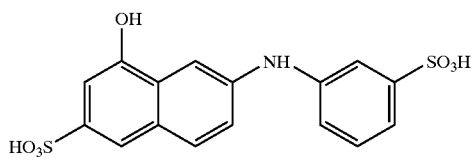 | 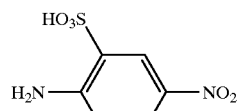 |
| 246 | 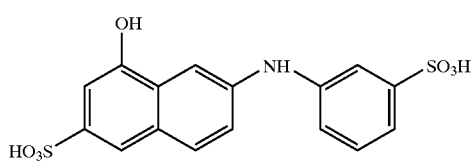 | 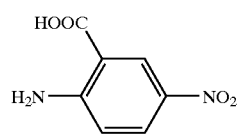 |
| 247 | 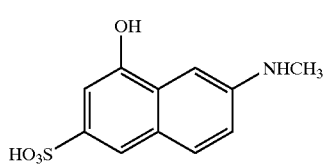 | 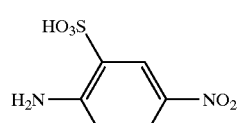 |
| 248 | 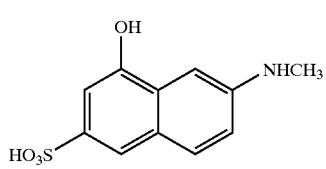 | 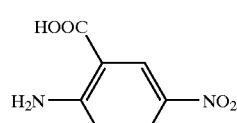 |
| 249 | 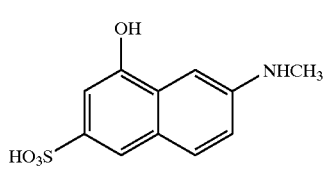 | 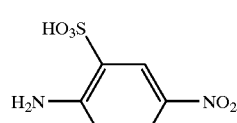 |
| 250 | 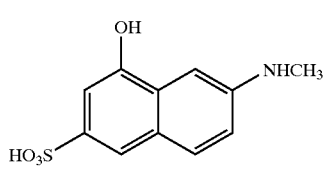 | 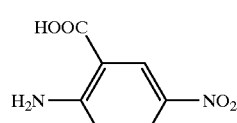 |
| 251 | 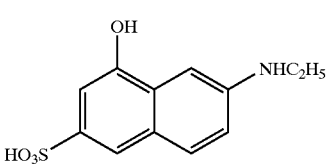 | 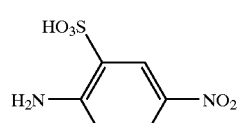 |
| 252 | 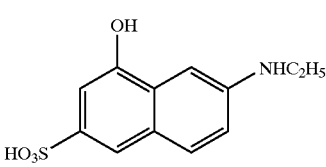 | 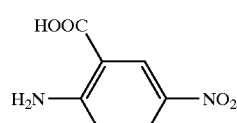 |
| 253 | 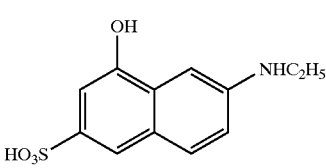 | 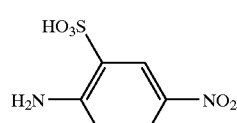 |

-continued
| | | |
|---|---|---|
| 254 | 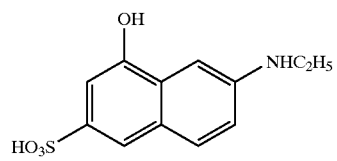 | 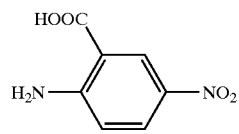 |
| 255 | 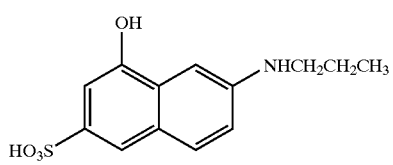 | 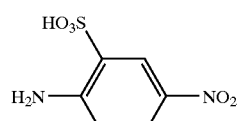 |
| 256 | 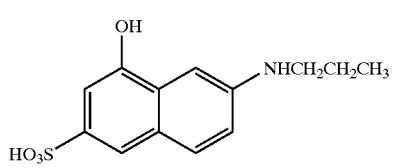 | 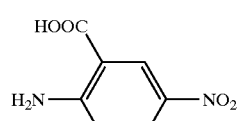 |
| 257 | 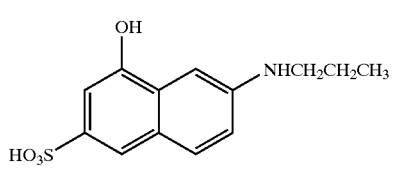 | 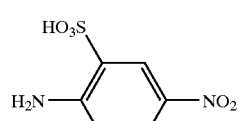 |
| 258 | 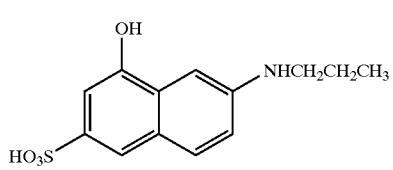 | 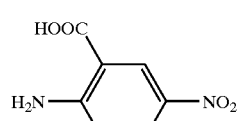 |
| 259 | 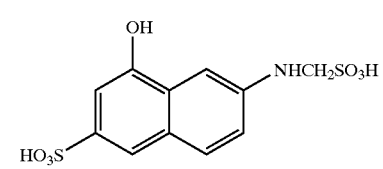 | 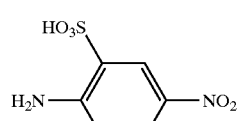 |
| 260 | 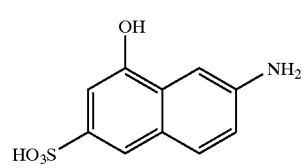 | 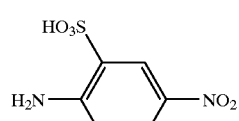 |
| 261 | 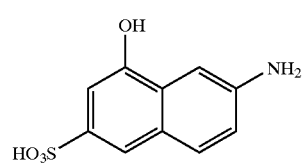 | 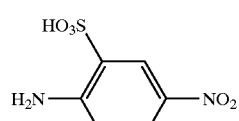 |
| 262 | 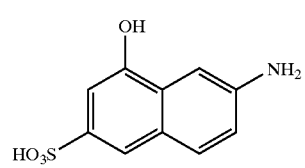 | 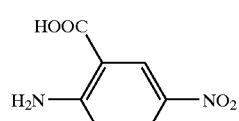 |

-continued
| | | |
|---|---|---|
| 263 | 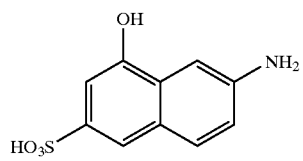 | 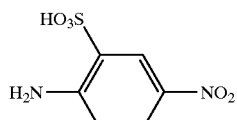 |
| 264 | 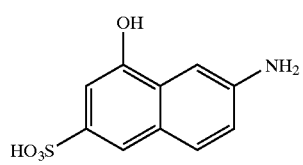 | 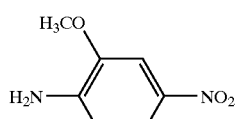 |
| 265 | 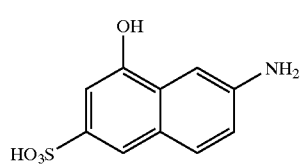 | 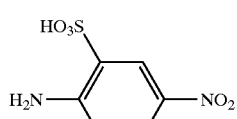 |
| 266 | 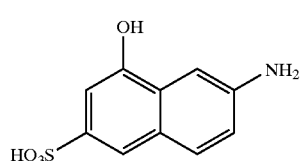 | 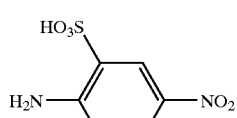 |
| 267 | 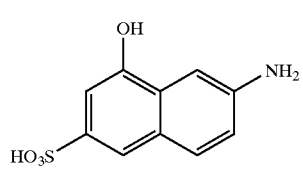 | 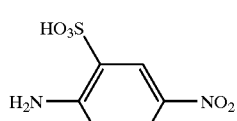 |
| 268 | 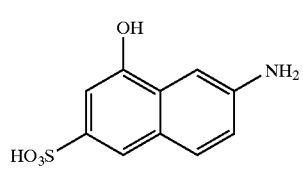 | 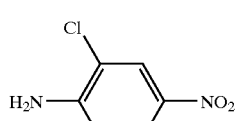 |
| Ex. No. | 3-Carboxypyridine | Compound of Formula (VIII) | Shade |
|---|---|---|---|
| 195 | 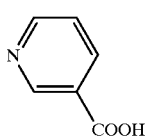 | 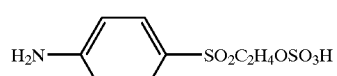 | Bluish red |
| 196 | 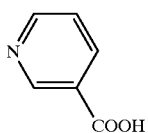 | 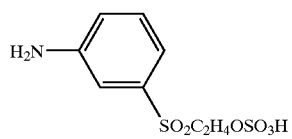 | Bluish red |
| 197 | 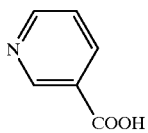 | 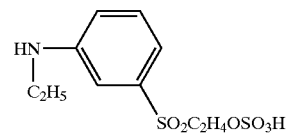 | Bluish red |

-continued
| 198 |  | 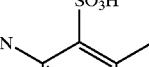 | Bluish red |
| 199 |  | 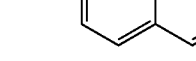 | Bluish red |
| 200 |  | 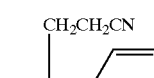 | Bluish red |
| 201 |  | 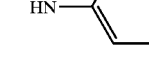 | Bluish red |
| 202 |  |  | Bluish red |
| 203 |  | 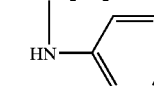 | Bluish red |
| 204 |  |  | Bluish red |
| 205 |  | 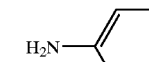 | Bluish red |
| 206 |  |  | Bluish red |
| 207 |  | 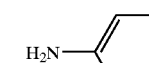 | Bluish red |

-continued

| | | | |
|---|---|---|---|
| 208 | pyridine-3-COOH | 2-amino-1-sulfo-6-(SO₂C₂H₄OSO₃H)-naphthalene | Bluish red |
| 209 | pyridine-3-COOH | 3-(NHCH₂CH₂CN)-C₆H₄-SO₂C₂H₄OSO₃H | Bluish red |
| 210 | pyridine-3-COOH | 3-(NHCH₂CH₂OH)-C₆H₄-SO₂C₂H₄OSO₃H | Bluish red |
| 211 | pyridine-3-COOH | 3-H₂N-C₆H₄-SO₂C₂H₄OSO₃H | Bluish red |
| 212 | pyridine-3-COOH | 3-H₂N-C₆H₄-SO₂C₂H₄OSO₃H | Bluish red |
| 213 | pyridine-3-COOH | 4-H₂N-C₆H₄-SO₂C₂H₄OSO₃H | Bluish red |
| 214 | pyridine-3-COOH | 3-H₂N-C₆H₄-SO₂C₂H₄OSO₃H | Bluish red |
| 215 | pyridine-3-COOH | 3-(NHC₂H₅)-C₆H₄-SO₂C₂H₄OSO₃H | Bluish red |
| 216 | pyridine-3-COOH | 3-H₂N-C₆H₄-SO₂C₂H₄OSO₃H | Bluish red |
| 217 | pyridine-3-COOH | 2-amino-1-sulfo-6-(SO₂C₂H₄OSO₃H)-naphthalene | Bluish red |

-continued
| | | | |
|---|---|---|---|
| 218 | 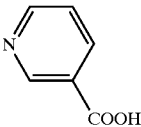 |  | Bluish red |
| 219 | 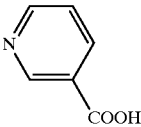 | 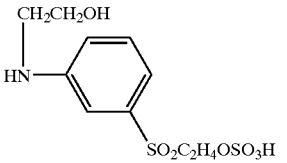 | Bluish red |
| 220 | 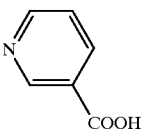 | 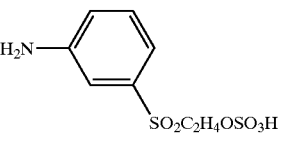 | Bluish red |
| 221 | 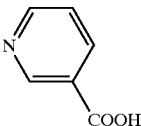 | 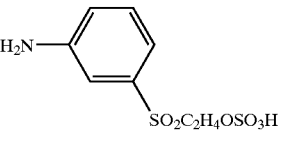 | Bluish red |
| 222 | 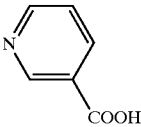 | 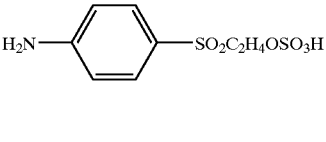 | Bluish red |
| 223 | 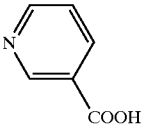 | 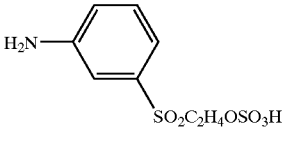 | Bluish red |
| 224 | 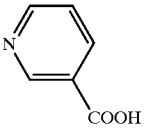 | 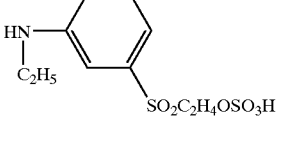 | Bluish red |
| 225 | 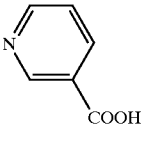 | 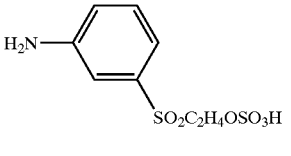 | Bluish red |
| 226 | 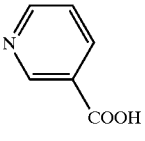 | 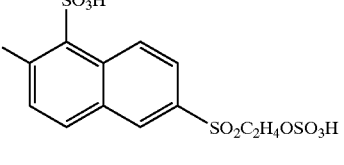 | Bluish red |
| 227 | 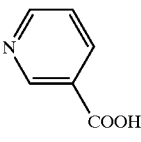 | 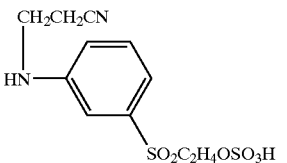 | Bluish red |

-continued
| 228 | 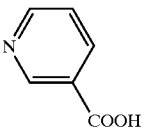 | 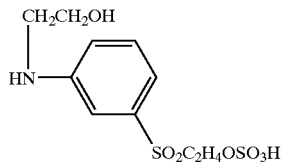 | Bluish red |
| 229 | 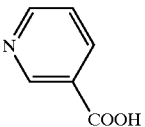 | 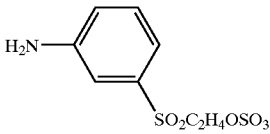 | Bluish red |
| 230 | 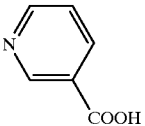 | 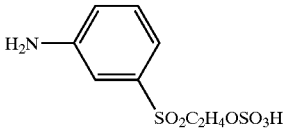 | Bluish red |
| 231 | 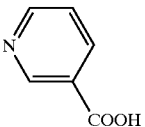 | 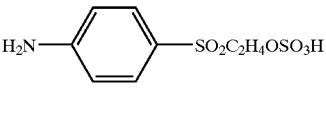 | Bluish red |
| 232 | 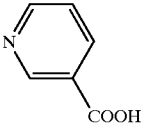 | 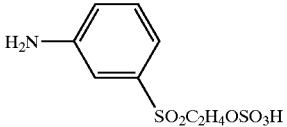 | Bluish red |
| 233 | 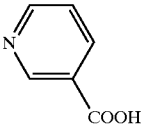 | 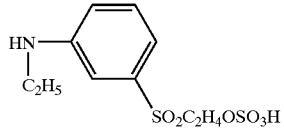 | Bluish red |
| 234 | 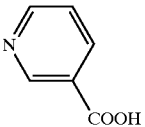 |  | Bluish red |
| 235 | 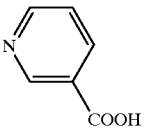 | 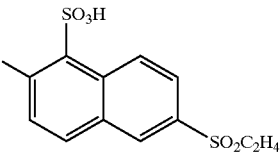 | Bluish red |
| 236 | 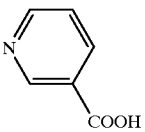 | 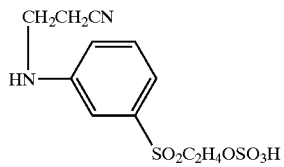 | Bluish red |
| 237 | 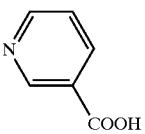 | 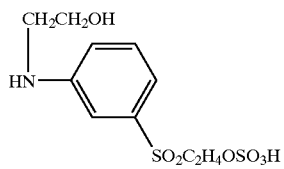 | Bluish red |

-continued
| 238 |  | 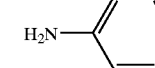 | Bluish red |
|---|---|---|---|
| 239 |  |  | Bluish red |
| 240 |  | 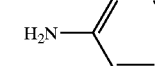 | Bluish red |
| 241 |  |  | Bluish red |
| 242 |  | 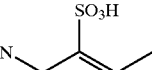 | Bluish red |
| 243 |  | 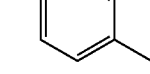 | Bluish red |
| 244 |  | 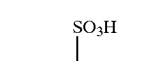 | Bluish red |
| 245 |  | 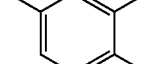 | Bluish red |
| 246 |  |  | Bluish red |
| 247 |  | 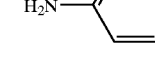 | Bluish red |

-continued
| 248 | 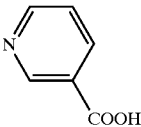 | 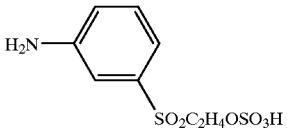 | Bluish red |
| 249 | 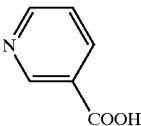 | 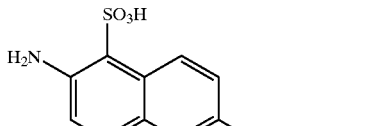 | Bluish red |
| 250 | 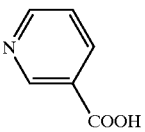 | 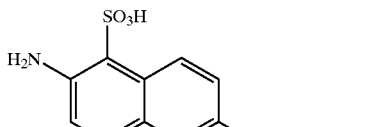 | Bluish red |
| 251 | 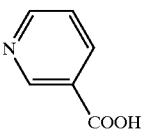 | 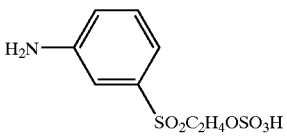 | Bluish red |
| 252 | 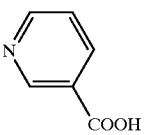 | 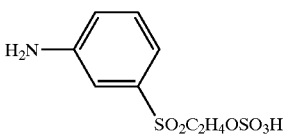 | Bluish red |
| 253 | 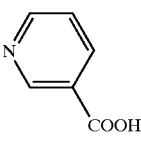 | 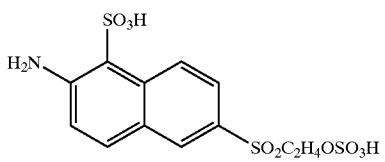 | Bluish red |
| 254 | 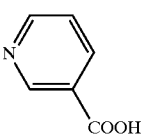 | 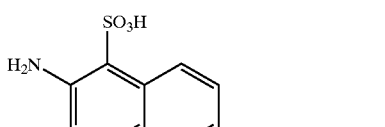 | Bluish red |
| 255 | 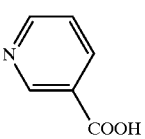 | 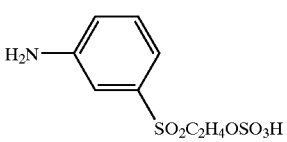 | Bluish red |
| 256 | 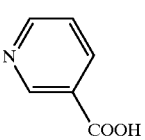 | 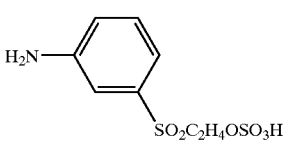 | Bluish red |
| 257 | 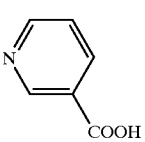 | 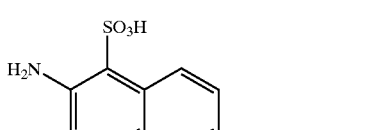 | Bluish red |

-continued

| | | | |
|---|---|---|---|
| 258 | nicotinic acid (pyridine-3-COOH) | 2-amino-6-(SO₂C₂H₄OSO₃H)-naphthalene-1-SO₃H | Bluish red |
| 259 | nicotinic acid | 3-H₂N-C₆H₄-SO₂C₂H₄OSO₃H | Bluish red |
| 260 | nicotinic acid | 3-H₂N-C₆H₄-SO₂C₂H₄OSO₃H | Bluish red |
| 261 | nicotinic acid | 4-H₂N-C₆H₄-SO₂C₂H₄OSO₃H | Bluish red |
| 262 | nicotinic acid | 3-H₂N-C₆H₄-SO₂C₂H₄OSO₃H | Bluish red |
| 263 | nicotinic acid | 3-(C₂H₅-HN)-C₆H₄-SO₂C₂H₄OSO₃H | Bluish red |
| 264 | nicotinic acid | 3-H₂N-C₆H₄-SO₂C₂H₄OSO₃H | Bluish red |

-continued

| | | | |
|---|---|---|---|
| 265 | 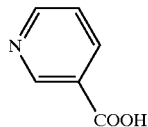 | 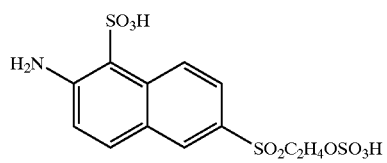 | Bluish red |
| 266 | 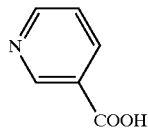 | 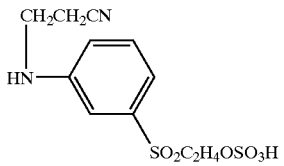 | Bluish red |
| 267 | 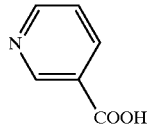 | 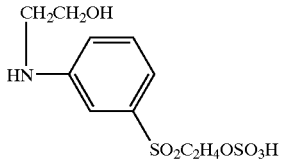 | Bluish red |
| 268 | 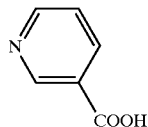 | 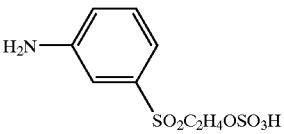 | Bluish red |

EXAMPLE 269

2-Amino-8-hydroxynaphthalene-6-disulfonic acid (23.8 parts) was added to 4-nitro-2-sulphobenzene diazonium chloride prepared as in Example 1, and the mixture was stirred for 12 hours at room temperature, to effect coupling. The reaction mixture was then adjusted to pH 8 to 10, and mixed with sodium sulfide (10.7 parts), and the mixture was heated to 60.° C. and stirred for 3 hours at this temperature to reduce the nitro group. Then, the reaction mixture was mixed with sodium chloride (40 parts) to deposit a solid, which was collected and washed. The resulting wet cake was dissolved in water (400 parts). The solution was mixed with cyanuric chloride (16.7 parts), and the mixture was stirred for 5 hours at 0 to 10° C., while controlling the pH within a range of 4 to 5 using a 20% aqueous solution of sodium carbonate, thereby performing a first condensation. To this reaction mixture was added 1-N-ethylaminobenzene-3-β-sulfatoethylsulfone (27.8 parts), and the mixture is heated to 55° C. and maintained at a pH 4 to 5 by means of a 20% aqueous solution of sodium carbonate until the reaction has ended after 3 to 5 hours.

To the resulting solution is added sodium chloride to precipitate the desired product of formula (269), (λmax=518 nm),

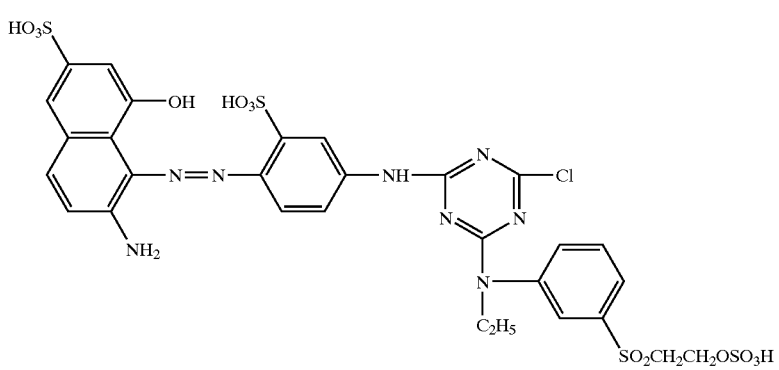

(269)

EXAMPLE 270 to 295

By a similar procedure compounds of examples 270 to 295 were prepared. Each naphthol compound of formula (XI) shown in a second column of the following table was used in place of 2-amino-8-hydroxynaphthalene-6-disulfonic acid, and each compound of the formula (X) shown in a third column in place of 4-nitroaniline-2-sulfonic acid, cyanuric chloride or cyanuric fluoride as shown in a fourth column in which Cl and F denote cyanuric chloride and cyanuric fluoride, and each aromatic amine compound of the formula (VIII) shown in a fifth column in place of 1-N-ethylaminobenzene-3-β-sulfatoethylsulfone, thereby obtaining the desired corresponding monoazo compound.

| Ex. No. | Compound of Formula (XI) | Compound of Formula (X) | Cyanuric chloride or Cyanuric fluoride | Compound of Formula (VIII) | Shade |
|---|---|---|---|---|---|
| 270 | [naphthol: OH, NH₂, HO₃S] | 2-HO₃S, 4-NO₂ aniline | Cl | HN(C₂H₅)-C₆H₄-SO₂C₂H₄OSO₃H (para) | Bluish red |
| 271 | [naphthol: OH, NH₂, HO₃S] | 2-HOOC, 4-NO₂ aniline | Cl | HN(C₂H₅)-C₆H₄-SO₂C₂H₄OSO₃H (meta) | Bluish red |
| 272 | [naphthol: OH, NH₂, HO₃S] | 2-HO₃S, 4-NO₂ aniline | Cl | HN(CH₃)-C₆H₄-SO₂C₂H₄OSO₃H (meta) | Bluish red |
| 273 | [naphthol: OH, NH₂, HO₃S] | 2-H₃CO, 4-NO₂ aniline | Cl | HN(C₂H₅)-C₆H₄-SO₂C₂H₄OSO₃H (meta) | Bluish red |
| 274 | [naphthol: OH, NH₂, HO₃S] | 2-HO₃S, 4-NO₂ aniline | Cl | HN(C₂H₅)-naphthalene-SO₂C₂H₄OSO₃H, SO₃H | Bluish red |
| 275 | [naphthol: OH, NH₂, HO₃S] | 2-HO₃S, 4-NO₂ aniline | Cl | HN(CH₂CH₂CN)-C₆H₄-SO₂C₂H₄OSO₃H (meta) | Bluish red |
| 276 | [naphthol: OH, NH₂, HO₃S] | 2-HO₃S, 4-NO₂ aniline | Cl | HN(CH₂CH₂OH)-C₆H₄-SO₂C₂H₄OSO₃H (meta) | Bluish red |

-continued

| Ex. No. | Compound of Formula (XI) | Compound of Formula (X) | Cyanuric chloride or Cyanuric fluoride | Compound of Formula (VIII) | Shade |
|---|---|---|---|---|---|
| 277 | 7-amino-1-hydroxy-3-naphthalenesulfonic acid (OH, NH$_2$, HO$_3$S) | 2-chloro-4-nitroaniline (Cl, H$_2$N, NO$_2$) | Cl | 3-(ethylamino)phenyl-β-sulfatoethylsulfone (HN-C$_2$H$_5$, SO$_2$C$_2$H$_4$OSO$_3$H) | Bluish red |
| 278 | 7-amino-1-hydroxy-3-naphthalenesulfonic acid | 2-amino-5-nitrobenzenesulfonic acid (HO$_3$S, H$_2$N, NO$_2$) | F | 3-(ethylamino)phenyl-β-sulfatoethylsulfone | Bluish red |
| 279 | 7-amino-1-hydroxy-3-naphthalenesulfonic acid | 2-amino-5-nitrobenzenesulfonic acid | F | 4-(ethylamino)phenyl-β-sulfatoethylsulfone (HN-C$_2$H$_5$, SO$_2$C$_2$H$_4$OSO$_3$H) | Bluish red |
| 280 | 7-amino-1-hydroxy-3-naphthalenesulfonic acid | 2-amino-5-nitrobenzoic acid (HOOC, H$_2$N, NO$_2$) | F | 3-(ethylamino)phenyl-β-sulfatoethylsulfone | Bluish red |
| 281 | 7-amino-1-hydroxy-3-naphthalenesulfonic acid | 2-amino-5-nitrobenzenesulfonic acid | F | 3-(methylamino)phenyl-β-sulfatoethylsulfone (HN-CH$_3$, SO$_2$C$_2$H$_4$OSO$_3$H) | Bluish red |
| 282 | 7-amino-1-hydroxy-3-naphthalenesulfonic acid | 2-amino-5-nitroanisole (H$_3$CO, H$_2$N, NO$_2$) | F | 3-(ethylamino)phenyl-β-sulfatoethylsulfone | Bluish red |
| 283 | 7-amino-1-hydroxy-3-naphthalenesulfonic acid | 2-amino-5-nitrobenzenesulfonic acid | F | 7-(ethylamino)-1-(β-sulfatoethylsulfonyl)-3-naphthalenesulfonic acid (C$_2$H$_5$, HN-, SO$_2$C$_2$H$_4$OSO$_3$H, SO$_3$H) | Bluish red |
| 284 | 7-amino-1-hydroxy-3-naphthalenesulfonic acid | 2-amino-5-nitrobenzenesulfonic acid | F | 3-(2-cyanoethylamino)phenyl-β-sulfatoethylsulfone (CH$_2$CH$_2$CN, HN-, SO$_2$C$_2$H$_4$OSO$_3$H) | Bluish red |

-continued

| Ex. No. | Compound of Formula (XI) | Compound of Formula (X) | Cyanuric chloride or Cyanuric fluoride | Compound of Formula (VIII) | Shade |
|---|---|---|---|---|---|
| 285 | 7-amino-1-hydroxy-3-sulfo-naphthalene (OH, NH2, HO3S on naphthalene) | 2-amino-5-nitrobenzenesulfonic acid (HO3S, H2N, NO2 on benzene) | F | 3-(β-sulfatoethylsulfonyl)-N-(2-hydroxyethyl)aniline (HN-CH2CH2OH, SO2C2H4OSO3H) | Bluish red |
| 286 | 7-amino-1-hydroxy-3-sulfo-naphthalene | 2-amino-5-nitrochlorobenzene (Cl, H2N, NO2) | F | 3-(β-sulfatoethylsulfonyl)-N-ethylaniline (HN-C2H5, SO2C2H4OSO3H) | Bluish red |
| 287 | 6-amino-4-hydroxy-2,7-naphthalenedisulfonic acid | 2-amino-5-nitrobenzenesulfonic acid | F | 3-(β-sulfatoethylsulfonyl)-N-ethylaniline | Bluish red |
| 288 | 6-amino-4-hydroxy-2,7-naphthalenedisulfonic acid | 2-amino-5-nitrobenzenesulfonic acid | F | 4-(β-sulfatoethylsulfonyl)-N-ethylaniline | Bluish red |
| 289 | 6-amino-4-hydroxy-2,7-naphthalenedisulfonic acid | 2-amino-5-nitrobenzoic acid (HOOC, H2N, NO2) | F | 3-(β-sulfatoethylsulfonyl)-N-ethylaniline | Bluish red |
| 290 | 6-amino-4-hydroxy-2,7-naphthalenedisulfonic acid | 2-amino-5-nitrobenzenesulfonic acid | F | 3-(β-sulfatoethylsulfonyl)-N-methylaniline (HN-CH3) | Bluish red |
| 291 | 6-amino-4-hydroxy-2,7-naphthalenedisulfonic acid | 2-amino-5-nitroanisole (H3CO, H2N, NO2) | F | 3-(β-sulfatoethylsulfonyl)-N-ethylaniline | Bluish red |
| 292 | 6-amino-4-hydroxy-2,7-naphthalenedisulfonic acid | 2-amino-5-nitrobenzenesulfonic acid | F | N-ethyl-7-amino-1-(β-sulfatoethylsulfonyl)-3-sulfonaphthalene (C2H5, HN, SO2C2H4OSO3H, SO3H) | Bluish red |

| Ex. No. | Compound of Formula (XI) | Compound of Formula (X) | Cyanuric chloride or Cyanuric fluoride | Compound of Formula (VIII) | Shade |
|---|---|---|---|---|---|
| 293 | OH, NH₂, HO₃S, SO₃H (naphthalene with OH, NH₂, 2×SO₃H) | HO₃S, H₂N–C₆H₃–NO₂ | F | CH₂CH₂CN, HN–C₆H₄–SO₂C₂H₄OSO₃H | Bluish red |
| 294 | OH, NH₂, HO₃S, SO₃H (naphthalene) | HO₃S, H₂N–C₆H₃–NO₂ | F | CH₂CH₂OH, HN–C₆H₄–SO₂C₂H₄OSO₃H | Bluish red |
| 295 | OH, NH₂, HO₃S, SO₃H (naphthalene) | Cl, H₂N–C₆H₃–NO₂ | F | C₂H₅, HN–C₆H₄–SO₂C₂H₄OSO₃H | Bluish red |

EXAMPLE 296

Urea 100 parts, m-nitrobenzene sulfonic acid sodium salt, 10 parts, sodium bicarbonate, 20 parts, sodium alginate, 55 parts, warm water, 815 parts, were stirred in a vessel to give a completely homogeneous printing paste.

Dyestuff of formula (2) (prepared as in example 2), 3 parts, and the above printing paste, 100 parts, were mixed together to make a homogeneous colored paste. A 100 mesh printing screen covering an adequate sized piece of cotton fabric was painted with this colored paste on printing screen to give a colored fabric.

The colored fabric was placed in an oven at 65° C. to dry for 5 minutes then taken out, and put into a steam oven using saturated steam for 10 minutes at 102–105° C.

The colored fabric was washed with cold water, hot water, and soap then dried to obtain a bluish red fabric with good build-up, light fastness, wet fastness and wash fastness.

EXAMPLE 297

Dyestuff of formula (2) (prepared from the example 2), 3 parts was dissolved in 100 parts of water to give a padding liquor. 25 ml of alkali solution (NaOH (38° Be') 15 ml/l Glauber's salt 30 parts/l) were added to the padding liquor. The resultant solution was put into a pad roller machine. The cotton fabric was padded by the roller pad machine, then was batched for 4 hours. The padded fabric was washed with cold water, hot water, and soap solution then dried to obtain a bluish red fabric with good build-up, light fastness, wet fastness and wash fastness.

EXAMPLE 298

Dyestuff of formula (2) (prepared from the example 2), 0.25 parts was dissolved in 250 parts of water. To 40 ml of this solution, in a dyeing bottle, was added cotton fabric, Glauber's salt,2.4 parts, and 32% alkali solution, 2.5 parts. The dyeing bottle was shaken at 60° C. for 60 minutes. The colored fabric was washed with cold water, hot water, and soap solution then dried to obtain a bluish red fabric with good build-up, light fastness, wet fastness and wash fastness.

EXAMPLE 299

Dyestuff of the formula (35), (prepared as described in Example 35) 0.25 parts was dissolved in 250 parts of water. To 40 ml of this solution, in a dyeing bottle, was added cotton fabric, Glauber's salt,2.4 parts, and 32% alkali solution, 2.5 parts. The dyeing bottle was shaken at 60° C. for 60 minutes. The colored fabric was washed with cold water, hot water, and soap solution then dried to obtain a bluish red fabric with good build-up, light fastness, wet fastness and wash fastness.

EXAMPLE 300

Dyestuff of the formula (77), (prepared as described in Example 77) 0.25 parts was dissolved in 250 parts of water. To 40 ml of this solution, in a dyeing bottle, was added cotton fabric, Glauber's salt,2.4 parts, and 32% alkali solution, 2.5 parts. The dyeing bottle was shaken at 60° C. for 60 minutes. The colored fabric was washed with cold water, hot water, and soap solution then dried to obtain a bluish red fabric with good build-up, light fastness, wet fastness and wash fastness.

EXAMPLE 301

Dyestuff of the formula (119), (prepared as described in Example 119)0.25 parts was dissolved in 250 parts of water. To 40 ml of this solution, in a dyeing bottle, was added cotton fabric, Glauber's salt, 2.4 parts, and 32 % alkali solution, 2.5 parts. The dyeing bottle was shaken at 60° C. for 60 minutes. The colored fabric was washed with cold water, hot water, and soap solution then dried to obtain a bluish red fabric with good build-up, light fastness, wet fastness and wash fastness.

EXAMPLE 302

Dyestuff of the formula (194), (prepared as described in Example 194) 0.25 parts was dissolved in 250 parts of water. To 40 ml of this solution, in a dyeing bottle, was added cotton fabric, Glauber's salt, 2.4 parts, and 32 % alkali solution, 2.5 parts. The dyeing bottle was shaken at 60° C. for 60 minutes. The colored fabric was washed with cold water, hot water, and soap solution then dried to obtain a bluish red fabric with good build-up, light fastness, wet fastness and wash fastness.

EXAMPLE 303

Dyestuff of the formula (269), (prepared as described in Example 269) 0.25 parts was dissolved in 250 parts of water. To 40 ml of this solution, in a dyeing bottle, was added cotton fabric, Glauber's salt, 2.4 parts, and 32 % alkali solution, 2.5 parts. The dyeing bottle was shaken at 60° C. for 60 minutes. The colored fabric was washed with cold water, hot water, and soap solution then dried to obtain a bluish red fabric with good build-up, light fastness, wet fastness and wash fastness.

Although the present invention has been explained in relation to its preferred embodiment, it is to be understood that many other possible modifications and variations can be made without departing from the spirit and scope of the invention as hereinafter claimed.

What is claimed is:

1. A monoazo reactive red dyestuff of formula (I),

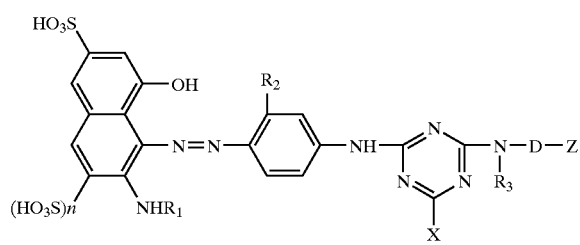

wherein:

X is —NHCN, —OH, —SCH$_2$COOH, —NHSO$_2$CH$_3$, 3-carboxypyridinium,

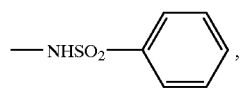

or halogen;

D is a phenyl having 0 to 3 substituent groups, said substituent groups are selected from the group consisting of halogen, C$_{1-4}$ alkyl, C$_{1-4}$ alkoxyl, nitro, amino, hydroxyl, carboxyl, phosphonic acid and sulfo group;

Z is —SO$_2$—CH=CH$_2$ or SO$_2$—CH$_2$—CH$_2$—U; U is —OSO$_3$H, Cl, Br, —OPO$_3$H$_2$, —SSO$_3$H or

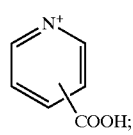

R$_2$ is sulfo, carboxy, halogen or C$_{1-4}$ alkoxy;

n is 1;

when X is a halogen atom, R$_1$ is limited to a hydrogen atom and R$_3$ is limited to C$_{1-4}$ alkyl or C$_{1-4}$ alkyl having at least one substituent;

when X is —NHCN, —OH, —SCH$_2$COOH, —NHSO$_2$CH$_3$, 3-carboxypyridinium or

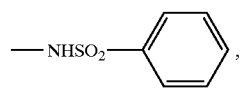

R$_1$ and R$_3$ independently can be any group selected from hydrogen atom, C$_{1-4}$ alkyl, phenyl,

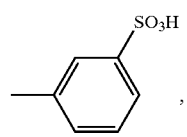

or C$_{1-4}$ alkyl having one or more substituent group selected from hydroxyl, carboxyl, sulfo, carbamoyl or methoxy carbonyl.

2. The monoazo reactive red dyestuff of claim 1, wherein X is —NHCN, 3-carboxypyridinium, chlorine or fluorine.

3. The monoazo reactive red dyestuff of claim 1, wherein Z is —SO$_2$—CH=CH$_2$, or —SO$_2$—CH$_2$—CH$_2$—OSO$_3$H.

4. The monoazo reactive red dyestuff of claim 1, wherein R$_2$ is sulfo or carboxy.

5. The monoazo reactive red dyestuff of claim 1, wherein while X is chlorine atom or fluorine atom, R$_1$ is hydrogen atom and R$_3$ is C$_{1-4}$ alkyl.

6. The monoazo reactive red dyestuff of claim 1, wherein while X is —NHCN, —OH, —SCH$_2$COOH, —NHSO$_2$CH$_3$, 3-carboxypyridinium or

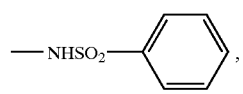

R$_1$ and R$_3$ independently can be any group selected from hydrogen atom or C$_{1-4}$ alkyl.

7. The monoazo reactive red dyestuff of claim 1, wherein dyestuff of formula (I) is the following formula (Ia),

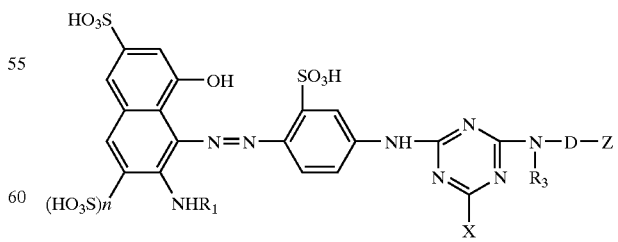

wherein:

X is —NHCN, —OH, —SCH$_2$COOH, —NHSO$_2$CH$_3$, 3-carboxypridinium,

—NHSO$_2$—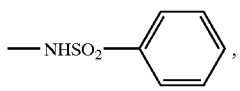, or halogen;

D is a phenyl having 0 to 3 substituent groups, said substituent groups are selected from the group consisting of halogen, $C_{1-4}$ alkyl, $C_{1-4}$ alkoxyl, nitro, amino, hydroxyl, carboxyl, phosphonic acid and sulfo group;

Z is —SO$_2$—CH=CH$_2$ or SO$_2$—CH$_2$—CH$_2$—U; U is —OSO$_3$H, Cl, Br, —OPO$_3$H$_2$, —SSO$_3$H or

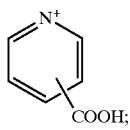

n is 1;

when X is a halogen atom, $R_1$ is limited to a hydrogen atom and $R_3$ is limited to $C_{1-4}$ alkyl or $C_{1-4}$ alkyl having at least one substituent;

when X is —NHCN, —OH, —SCH$_2$COOH, —NHSO$_2$CH$_3$, 3-carboxypyridinium or

—NHSO$_2$—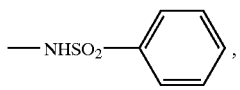, $R_1$ and $R_3$ independently can be any group selected from hydrogen atom, $C_{1-4}$ alkyl, phenyl,

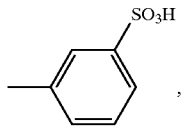

or $C_{1-4}$ alkyl having one or more substituent group selected from hydroxyl, carboxyl, sulfo, carbamoyl or methoxy carbonyl.

8. The monoazo reactive red dyestuff of claim 7, wherein X is is —NHCN, 3-carboxypyridinium, chlorine or fluorine.

9. The monoazo reactive red dyestuff of claim 7, wherein Z is —SO$_2$—CH=CH$_2$, or —SO$_2$—CH$_2$—CH$_2$—OSO$_3$H.

10. The monoazo reactive red dyestuff of claim 7, wherein while the X is chlorine atom or fluorine atom, the $R_1$ is hydrogen atom and the $R_3$ is $C_{1-4}$alkyl.

11. The monoazo reactive red dyestuff of claim 7, wherein while the X is —NHCN, —OH, —SCH$_2$COOH, —NHSO$_2$CH$_3$, 3-carboxypyridinium or —NHSO$_2$—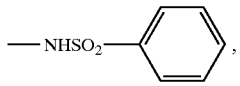, $R_1$ and $R_3$ independently can be any group selected from hydrogen atom or $C_{1-4}$ alkyl.

12. The monoazo reactive red dyestuff of claim 1, wherein formula (I) dyestuff is the following formula (Ib) dyestuff, (Ib)

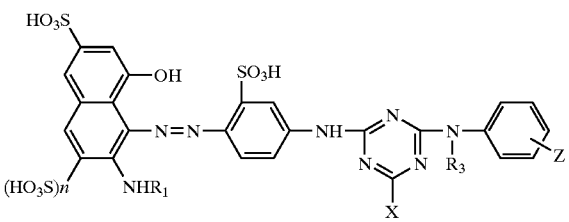

wherein:

X is —NHCN, —OH, —SCH2COOH, —NHSO2CH3, 3-carboxypyridinium,

—NHSO$_2$—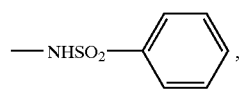, or halogen;

Z is —SO$_2$—CH=CH$_2$ or SO$_2$—CH$_2$—CH$_2$—U; U is —OSO3H, Cl or Br;

n is 1;

when X is a halogen atom, $R_1$ is limited to a hydrogen atom and $R_3$ is limited to $C_{1-4}$ alkyl;

when X is —NHCN, —OH, —SCH2COOH, —NHSO$_2$CH$_3$, 3-carboxypyridinium or

—NHSO$_2$—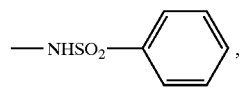, $R_1$ and $R_3$ independently can be any group selected from hydrogen atom, $C_{1-4}$ alkyl, or $C_{1-4}$ alkyl having one or more substituent group selected from hydroxyl, carboxyl, sulfo, carbamoyl or methoxy carbonyl.

13. The monoazo reactive red dyestuff of claim 12, wherein X is is —NHCN, 3-carboxypyridinium, chlorine or fluorine.

14. The monoazo reactive red dyestuff of claim 12, wherein Z is —SO$_2$—CH$_2$—CH$_2$—OSO$_3$H.

15. The monoazo reactive red dyestuff of claim 12, wherein while X is chlorine atom or fluorine atom, $R_1$ is hydrogen atom and $R_3$ is methyl, or ethyl.

16. The monoazo reactive red dyestuff of claim 12, wherein while the X is —NHCN, —OH, —SCH$_2$COOH, —NHSO$_2$CH$_3$, 3-carboxypyridinium or —NHSO$_2$—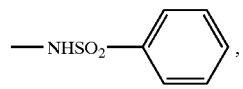, $R_1$ and $R_3$ independently can be any group selected from hydrogen atom, methyl, or ethyl.

17. The monoazo reactive red dyestuff of claim 12, wherein said formula (Ib) dyestuff is the following formula (I-1) dyestuff.
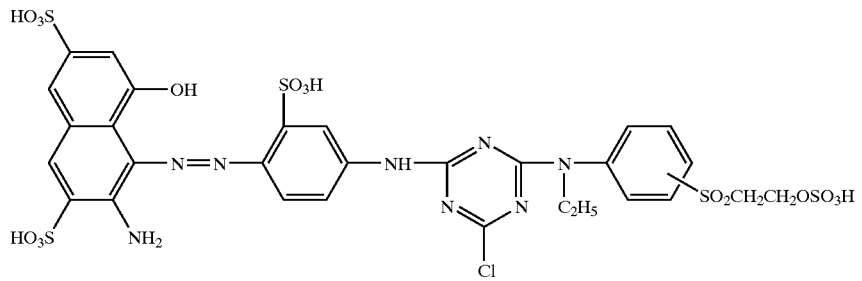
(I-1)
18. The monoazo reactive red dyestuff of claim 12, wherein said formula (Ib) dyestuff is the following formula (I-2) dyestuff.
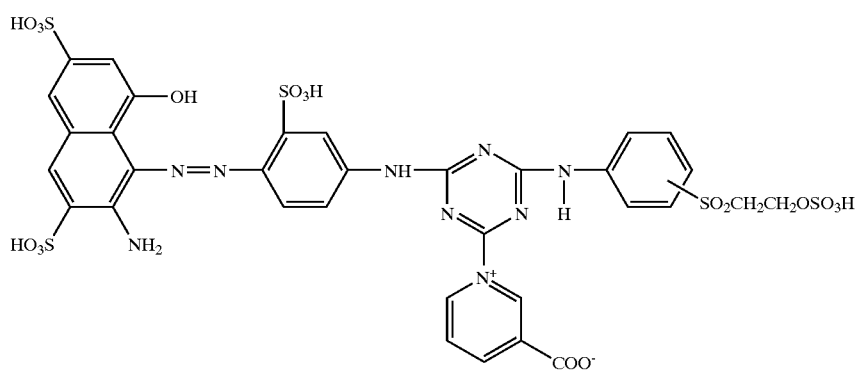
(I-2)
19. The monoazo reactive red dyestuff of claim 12, wherein said formula (Ib) dyestuff is the following formula (I-3) dyestuff.
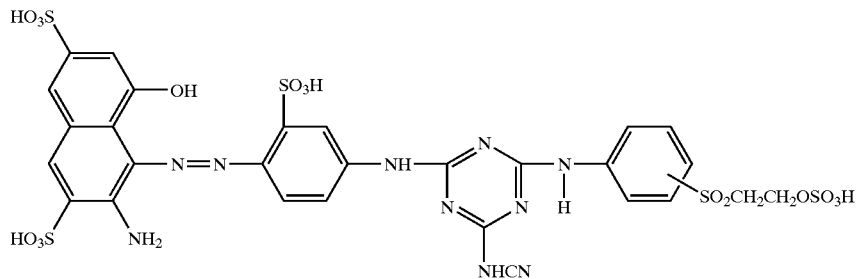
(I-3)

20. The monoazo reactive red dyestuff of claim 12, wherein said formula (Ib) dyestuff is the following formula (I-4) dyestuff.
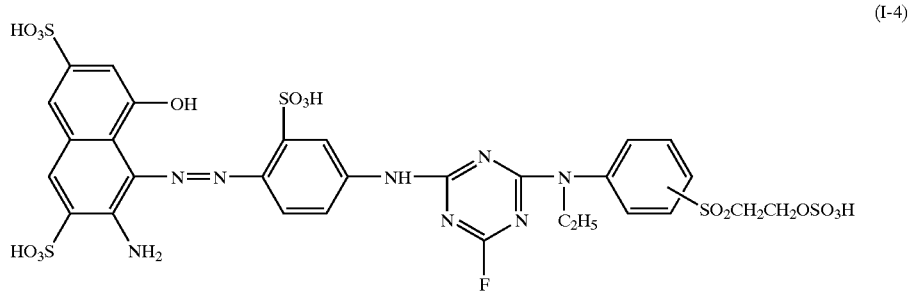
(I-4)
21. The monoazo reactive red dyestuff of claim 12, wherein said formula (Ib) dyestuff is the following formula (I-5) dyestuff.
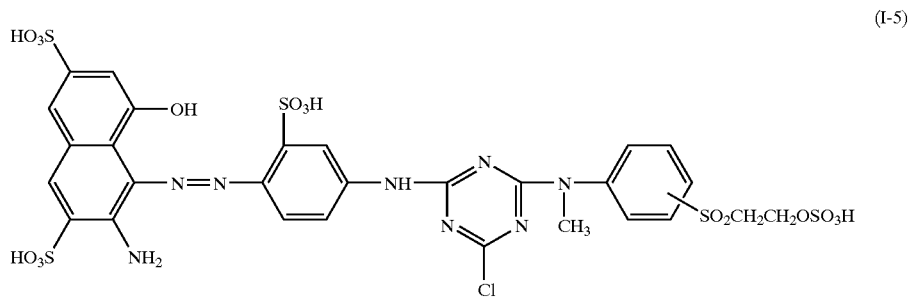
(I-5)
22. The monoazo reactive red dyestuff of claim 12, wherein said formula (Ib) dyestuff is the following formula (I-6) dyestuff.
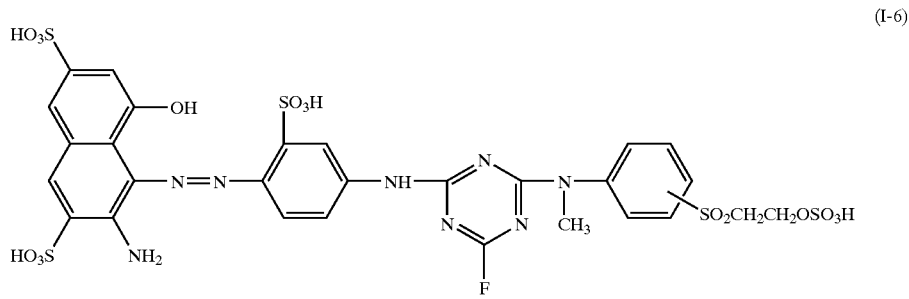
(I-6)
* * * * *